United States Patent
Patel et al.

(10) Patent No.: US 8,843,131 B2
(45) Date of Patent: Sep. 23, 2014

(54) REDUCING FREQUENT HANDOFFS OF A WIRELESS COMMUNICATION DEVICE

(75) Inventors: Chirag Sureshbhai Patel, San Diego, CA (US); Mehmet Yavuz, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 12/789,213

(22) Filed: May 27, 2010

(65) Prior Publication Data

US 2010/0304745 A1    Dec. 2, 2010

Related U.S. Application Data

(60) Provisional application No. 61/181,882, filed on May 28, 2009.

(51) Int. Cl.

| H04W 4/00 | (2009.01) |
|---|---|
| H04B 7/00 | (2006.01) |
| H04W 52/14 | (2009.01) |
| H04W 52/40 | (2009.01) |
| H04W 48/20 | (2009.01) |
| H04W 84/04 | (2009.01) |
| H04W 36/00 | (2009.01) |
| H04W 52/32 | (2009.01) |
| H04W 16/32 | (2009.01) |
| H04W 76/04 | (2009.01) |
| H04W 60/00 | (2009.01) |

(52) U.S. Cl.
CPC ............ *H04W 52/40* (2013.01); *H04W 52/143* (2013.01); *H04W 48/20* (2013.01); *H04W 84/045* (2013.01); *H04W 36/00* (2013.01); *H04W 52/325* (2013.01); *H04W 16/32* (2013.01); *H04W 76/048* (2013.01); *H04W 60/00* (2013.01)
USPC ......... 455/435.1; 455/434; 455/522; 455/517

(58) Field of Classification Search
USPC ...................................... 455/435.1
See application file for complete search history.

(56) References Cited

U.S. PATENT DOCUMENTS

| 2003/0012128 A1* | 1/2003 | Miyoshi et al. ............... 370/208 |
| 2005/0032536 A1* | 2/2005 | Wei et al. ...................... 455/517 |

(Continued)

FOREIGN PATENT DOCUMENTS

| EP | 2009941 | 12/2008 |
| KR | 20140033252 A | 3/2014 |

(Continued)

OTHER PUBLICATIONS

International Search Report and Written Opinion—PCT/US2010/036730, International Search Authority—European Patent Office—Jan. 18, 2011.

(Continued)

*Primary Examiner* — Lester Kincaid
*Assistant Examiner* — Andy Gu

(57) ABSTRACT

A method for reducing frequent idle handoffs of a wireless communication device is described. A registration request is received by a base station or a femto access point from the wireless communication device. The number of registration requests received from the wireless communication device are counted while the registration timer is running. It is determined that frequent handoffs are happening when the number of registration requests received is greater than a registration threshold. A transmit power of a femto access point is adjusted if the number of registration requests received indicates that frequent handoffs are happening.

25 Claims, 19 Drawing Sheets

(56) References Cited

U.S. PATENT DOCUMENTS

| | | |
|---|---|---|
| 2005/0096053 A1* | 5/2005 | Liu et al. .................. 455/439 |
| 2006/0166690 A1* | 7/2006 | Nishio et al. ............. 455/522 |
| 2006/0209760 A1* | 9/2006 | Saito et al. ............... 370/331 |
| 2007/0058673 A1* | 3/2007 | Leung ....................... 370/466 |
| 2009/0097451 A1 | 4/2009 | Gogic |
| 2009/0111499 A1 | 4/2009 | Bosch et al. |
| 2009/0291690 A1* | 11/2009 | Guvenc et al. ............ 455/444 |

FOREIGN PATENT DOCUMENTS

| | | |
|---|---|---|
| WO | WO-2008149116 A2 | 12/2008 |
| WO | WO2009058069 A1 | 5/2009 |

OTHER PUBLICATIONS

Qualcomm Europe: "Linger timer for HeNB reselection to improve standby time of UE in mobility situations," 3GPP Draft TSG-RAN WG2 meeting #63; R2-084155, 3rd Generation Partnership Project (3GPP), Jeju, Korea, (Aug. 12, 2008), XP050319291.

Qualcomm Europe: "UTRA HNB Idle Mode (Re)selection," 3GPP Draft TSG-RAN WG2 #62bis; R2-084347, 3rd Generation Partnership Project (3GPP), Jeju, Korea (Aug. 18, 2008), XP050319423.

Taiwan Search Report—TW099117273—TIPO—Apr. 21, 2013.

European Search Report—EP13179294—Search Authority—Munich—Nov. 11, 2013.

European Search Report—EP13184914—Search Authority—Munich—Nov. 7, 2013.

* cited by examiner

REDUCING FREQUENT HANDOFFS OF A WIRELESS COMMUNICATION DEVICE

RELATED APPLICATIONS

This application is related to and claims priority from U.S. Provisional Patent Application Ser. No. 61/181,882, filed May 28, 2009, for "Optimization of Idle Mode Search and Handoffs in Femto-Macro Deployments."

TECHNICAL FIELD

The present disclosure relates generally to wireless communication systems. More specifically, the present disclosure relates to systems and methods for reducing frequent handoffs of a wireless communication device to/from a femto access point.

BACKGROUND

Wireless communication systems have become an important means by which many people worldwide have come to communicate. A wireless communication system may provide communication for a number of mobile stations, each of which may be serviced by a base station.

It may be beneficial to use localized base stations that provide service to a select group of mobile stations. These localized base stations may use less power and have smaller coverage areas than normal base stations. The localized base stations may then provide a mobile station with active voice/data access. As localized base stations continue to improve, more localized base stations will become prevalent.

Examples of localized base stations include femtocells and picocells. Localized base stations may be referred to as femto access points without loss of generality. These localized base stations may be controlled by a user. For example, a localized base station may be purchased by an end user and placed in their home or office to increase wireless coverage. A localized base station may also be controlled by a service provider. For example, a service provider may place a localized base station in a public area with high traffic.

As a mobile station approaches a localized base station, the mobile station may detect the localized base station and attempt to access it by sending a registration request. The localized base station may then determine whether to allow access to this mobile station for different services such as a voice/data connection with the mobile station. Registration requests reduce the battery life of the mobile station and increase the network load. As such, benefits may be realized by reducing the number of registration requests made by a mobile station.

SUMMARY

A method for reducing frequent idle handoffs of a wireless communication device is described. A registration request is received from the wireless communication device. A registration timer is started. A number of registration requests received from the wireless communication device is counted while the registration timer is running. It is determined whether the number of registration requests received is greater than a registration threshold. A transmit power of a femto access point is adjusted if the number of registration requests received is greater than the registration threshold.

The wireless communication device may be part of a closed subscriber group (CSG) associated with the femto access point. Adjusting the transmit power of the femto access point may include increasing the transmit power of the femto access point. The wireless communication device may not be part of a closed subscriber group (CSG) associated with the femto access point. Adjusting the transmit power of the femto access point may include decreasing the transmit power of the femto access point. The transmit power of the femto access point may be adjusted by a power adjustment factor.

A power adjustment timer with a power adjustment time may be started. It may be determined whether the power adjustment timer has expired. It also may be determined whether frequent idle handoffs by the wireless communication device were detected while the power adjustment timer was running. Frequent handoffs by the wireless communication device may be detected while the power adjustment timer was running. The power adjustment time may be incrementally increased. The power adjustment factor may also be incrementally increased.

Frequent handoffs by the wireless communication device may not be detected while the power adjustment timer was running. The power adjustment time may be incrementally decreased. The power adjustment factor may also be incrementally decreased. The transmit power may be readjusted to a previous transmit power. Adjusting the transmit power of the femto access point may include adjusting a total forward link transmit power of the femto access point or adjusting a forward link pilot transmit power of the femto access point. A registration request may be an active handoff request passed via a core network.

A wireless device configured for reducing frequent idle handoffs of a wireless communication device is also described. The wireless device includes a processor, memory in electronic communication with the processor and instructions stored in the memory. The instructions are executable by the processor to receive a registration request from the wireless communication device. The instructions are also executable by the processor to start a registration timer. The instructions are further executable by the processor to count a number of registration requests received from the wireless communication device while the registration timer is running. The instructions are also executable by the processor to determine whether the number of registration requests received is greater than a registration threshold. The instructions are further executable by the processor to adjust a transmit power of the wireless device if the number of registration requests received is greater than the registration threshold.

A method for reducing frequent idle handoffs of a wireless communication device is described. A registration request is sent to a femto access point. A trigger for an idle handoff away from the femto access point is detected. A handout timer is started. It is determined whether a handout trigger condition is satisfied within a monitoring period after the handout timer has expired.

The trigger for an idle handoff away from the femto access point may be an idle handout trigger. An idle handoff away from the femto access point may be performed if the handout trigger condition is satisfied within a monitoring period after the handout timer has expired. The method may include staying on the femto access point if the handout trigger condition is not satisfied within a monitoring period after the handout timer has expired.

A forward link received power from the femto access point may be compared with a handout threshold before the handout timer has expired. The idle handoff away from the femto access point may be performed prior to the handout timer expiring if the forward link received power from the femto access point is less than the handout threshold.

An observation timer may be started. A number of registrations attempted to the femto access point before the observation timer has expired may be counted. An idle handoff away from the femto access point may be performed after the observation timer has expired if the number of registrations attempted to the femto access point is greater than an observation threshold and handoff away from the femto access point is triggered.

The wireless communication device may be part of a closed subscriber group (CSG) associated with the femto access point. The wireless communication device may also not be part of a closed subscriber group (CSG) associated with the femto access point. The trigger for an idle handoff away from the femto access point may be to a macro base station. The wireless communication device may be able to distinguish between pilots received from the femto access point and pilots received from a macro base station.

A wireless device configured for reducing frequent idle handoffs of the wireless device is also described. The wireless device includes a processor, memory in electronic communication with the processor and instructions stored in the memory. The instructions are executable by the processor to send a registration request to a femto access point. The instructions are also executable by the processor to detect a trigger for an idle handoff away from the femto access point. The instructions are further executable by the processor to start a handout timer. The instructions are also executable by the processor to determine whether a handout trigger condition is satisfied within a monitoring period after the handout timer has expired.

A method for reducing frequent idle handoffs of a wireless communication device is described. The method includes determining that changes to an idle mode pilot search trigger threshold are needed. The idle mode pilot search trigger threshold is adjusted.

The method may be performed by a femto access point. Adjusting the idle mode pilot search trigger threshold may include sending instructions to the wireless communication device to adjust the idle mode pilot search trigger threshold.

The method may be performed by the wireless communication device. Determining that changes to an idle mode pilot search trigger threshold are needed may include receiving instructions to adjust the idle mode pilot search trigger threshold from a femto access point.

A wireless device configured for reducing frequent idle handoffs of a wireless communication device is also described. The wireless device includes a processor, memory in electronic communication with the processor and instructions stored in the memory. The instructions are executable by the processor to determine that changes to an idle mode pilot search trigger threshold are needed. The instructions are also executable by the processor to adjust the idle mode pilot search trigger threshold.

A wireless device configured for reducing frequent idle handoffs of a wireless communication device is described. The wireless device includes means for receiving a registration request from the wireless communication device. The wireless device also includes means for starting a registration timer. The wireless device further includes means for counting a number of registration requests received from the wireless communication device while the registration timer is running. The wireless device also includes means for determining whether the number of registration requests received is greater than a registration threshold. The wireless device further includes means for adjusting a transmit power of the femto access point if the number of registration requests received is greater than the registration threshold.

A computer-program product for reducing frequent idle handoffs of a wireless communication device is described. The computer-program product includes a computer-readable medium having instructions thereon. The instructions include code for causing at least one computer to receive a registration request from the wireless communication device. The instructions also include code for causing at least one computer to start a registration timer. The instructions further include code for causing at least one computer to count a number of registration requests received from the wireless communication device while the registration timer is running. The instructions also include code for causing at least one computer to determine whether the number of registration requests received is greater than a registration threshold. The instructions further include code for causing at least one computer to adjust a transmit power of the femto access point if the number of registration requests received is greater than the registration threshold.

A wireless device configured for reducing frequent idle handoffs of the wireless device is also described. The wireless device includes means for sending a registration request to a femto access point. The wireless device also includes means for detecting a trigger for an idle handoff away from the femto access point. The wireless device further includes means for starting a handout timer. The wireless device also includes means for determining whether a handout trigger condition is satisfied within a monitoring period after the handout timer has expired.

A computer-program product for reducing frequent idle handoffs of a wireless communication device is described. The computer-program product is a computer-readable medium having instructions thereon. The instructions include code for causing at least one computer to send a registration request to a femto access point. The instructions also include code for causing at least one computer to detect a trigger for an idle handoff away from the femto access point. The instructions further include code for causing at least one computer to start a handout timer. The instructions also include code for determining whether a handout trigger condition is satisfied within a monitoring period after the handout timer has expired.

A wireless device configured for reducing frequent idle handoffs of a wireless communication device is described. The wireless device includes means for determining that changes to an idle mode pilot search trigger threshold are needed. The wireless device also includes means for adjusting the idle mode pilot search trigger threshold.

A computer-program product for reducing frequent idle handoffs of a wireless communication device is described. The computer-program product is a computer-readable medium having instructions thereon. The instructions include code for causing at least one computer to determine that changes to an idle mode pilot search trigger threshold are needed. The instructions also include code for causing at least one computer to adjust the idle mode pilot search trigger threshold.

DETAILED DESCRIPTION

Figure 1:
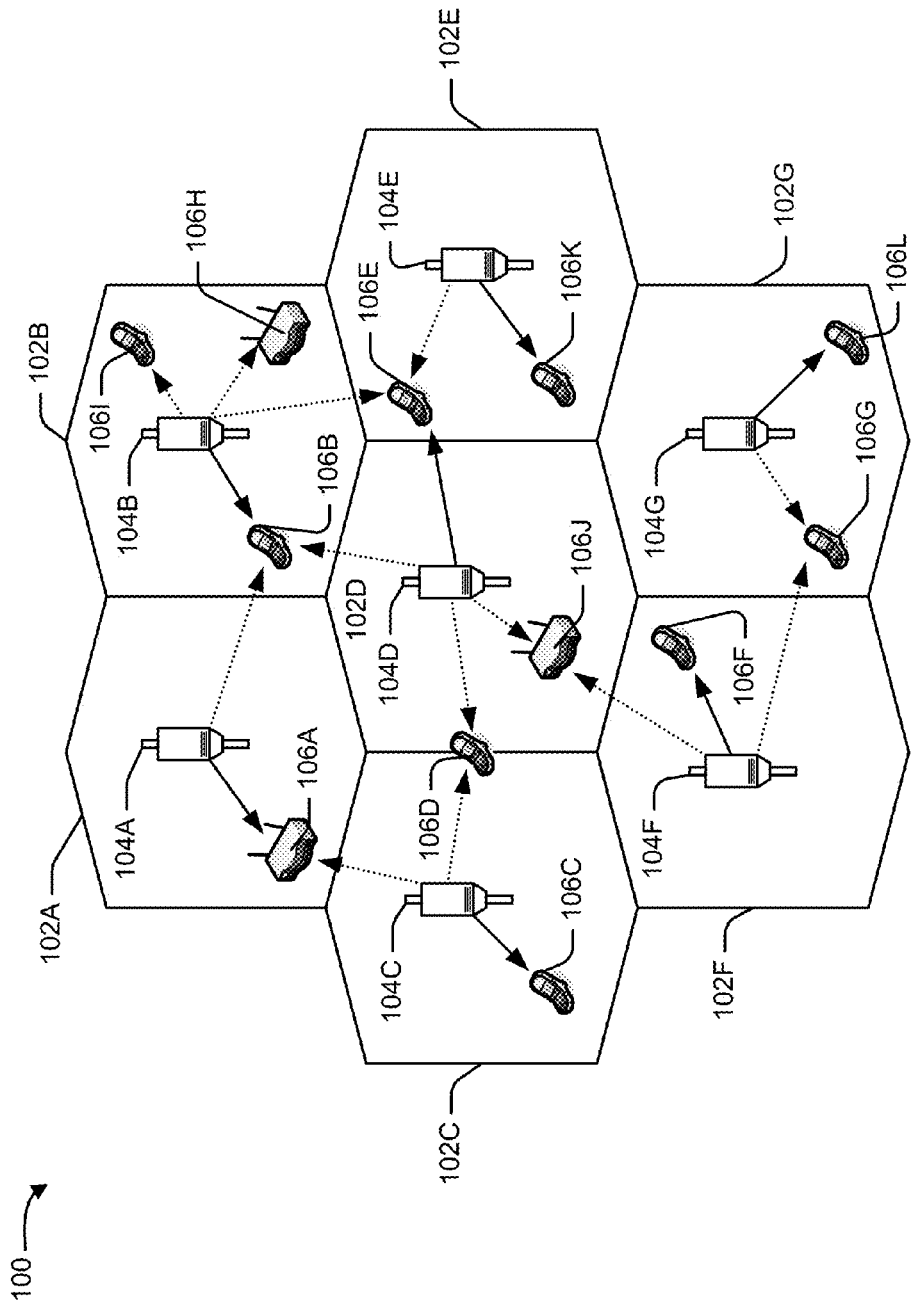
FIG. 1 illustrates a wireless communication system, configured to support a number of users, in which the teachings herein may be implemented.

FIG. 1 illustrates a wireless communication system 100, configured to support a number of users, in which the teachings herein may be implemented. The system 100 provides communication for multiple cells 102, such as, for example, macro cells 102A-102G, with each cell being serviced by a corresponding access node 104 (e.g., access nodes 104A-104G). As shown in FIG. 1, access terminals 106 (e.g., access terminals 106A-106L) may be dispersed at various locations throughout the system over time. Each access terminal 106 may communicate with one or more access nodes 104 on a forward link ("FL") and/or a reverse link ("RL") at a given moment, depending upon whether the access terminal 106 is active and whether it is in soft handoff, for example. The wireless communication system 100 may provide service over a large geographic region. For example, macro cells 102A-102G may cover a few blocks in a neighborhood.

In some aspects, the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, macro base station, access point, evolved NodeB (eNB), macro cell and so on. Also, a femto node may be configured or referred to as a Home NodeB (HNB), Home evolved NodeB (HeNB), access point base station, femto cell, femto access point and so on.

Figure 2:
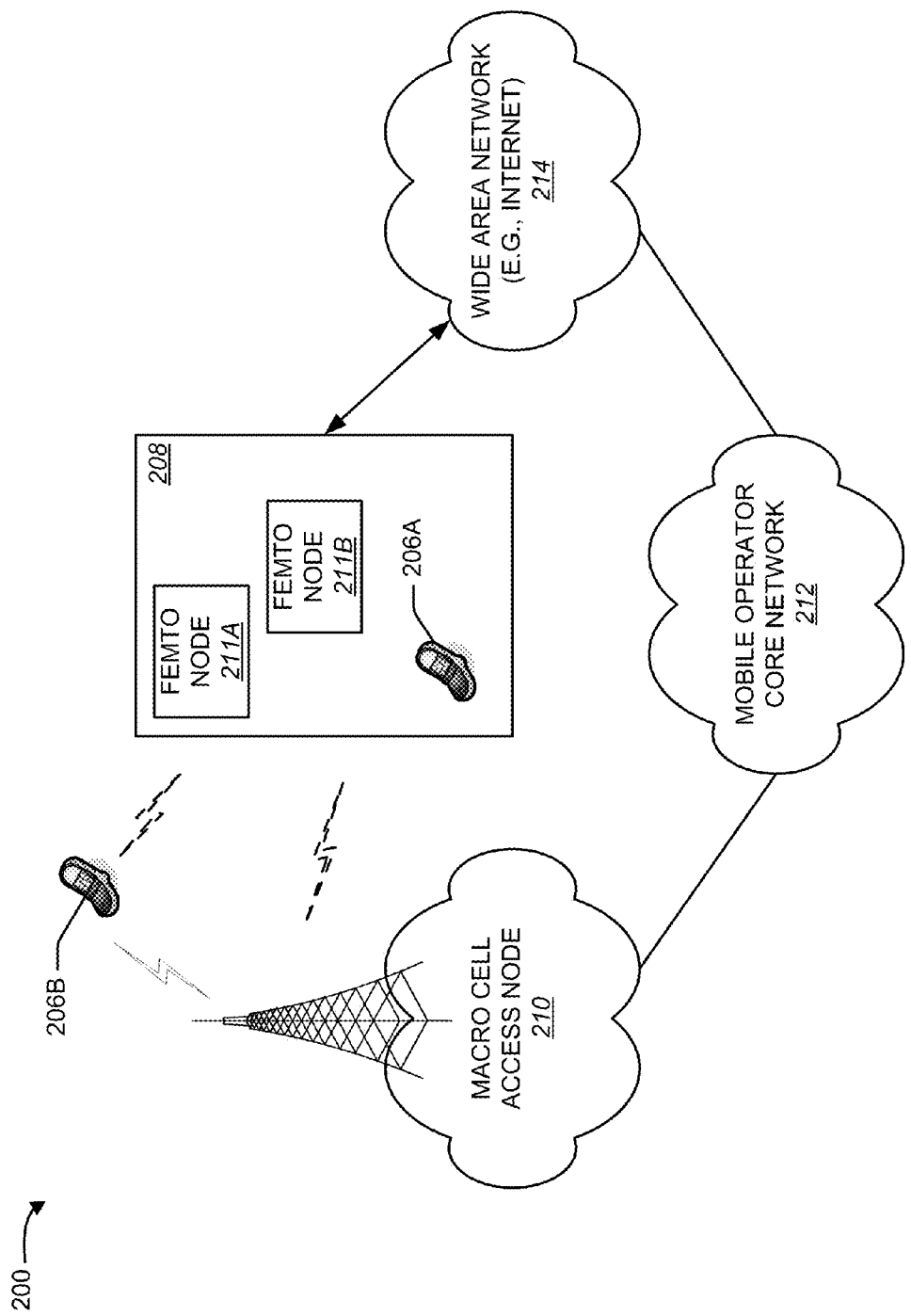
FIG. 2 illustrates an exemplary communication system where one or more femto nodes are deployed within a network environment.

FIG. 2 illustrates an exemplary communication system 200 where one or more femto nodes, also known as femto access points, are deployed within a network environment. The system 200 includes multiple femto nodes 211 (e.g., femto nodes 211A and 211B) installed in a relatively small scale network environment (e.g., in one or more user residences 208). Each femto node 211 may be coupled to a wide area network 214 (e.g., the Internet) and a mobile operator core network 212 via a DSL router, a cable modem, a wireless link or other connectivity means (not shown). As will be discussed below, each femto node 211 may be configured to serve associated access terminals 206, also known as user equipment, (e.g., access terminal 206A) and, optionally, alien access terminals 206 (e.g., access terminal 206B). In other words, access to femto nodes 211 may be restricted whereby a given femto node 211 may serve a set of designated access terminals 206 (e.g., home access terminals 206) but may serve any non-designated access terminals 206 (e.g., access terminals 206 of a neighbor).

The owner of a femto node 211 may subscribe to mobile service, such as, for example, 3G mobile service, offered through the mobile operator core network 212. In addition, an access terminal 206 may be capable of operating both in macro environments and in smaller scale (e.g., residential) network environments. In other words, depending on the current location of the access terminal 206, the access terminal 206 may be served by an access node 210 of the macro cell mobile network or by any one of a set of femto nodes 211 (e.g., the femto nodes 211A and 211B that reside within a corresponding user residence 208). For example, when a subscriber is outside his home, he is served by a standard macro access node (e.g., node 210) and when the subscriber is at home, he is served by a femto node (e.g., node 211A). Here, it should be appreciated that a femto node 211 may be backward compatible with existing access terminals 206.

A femto node 211 may be deployed on a single frequency or, in the alternative, on multiple frequencies. Depending on the particular configuration, the single frequency or one or more of the multiple frequencies may overlap with one or more frequencies used by a macro node (e.g., node 210).

In some aspects, an access terminal 206 may be configured to connect to a preferred femto node (e.g., the home femto node of the access terminal 206) whenever such connectivity is possible. For example, whenever the access terminal 206 is within the user's residence 208, it may be desired that the access terminal 206 communicate only with the home femto node 211.

In some aspects, if the access terminal 206 operates within the macro cellular network 210 but is not residing on its most preferred network (e.g., as defined in a preferred roaming list), the access terminal 206 may continue to search for the most preferred network (e.g., the preferred femto node 211) using a Better System Reselection ("BSR"), which may involve a periodic scanning of available systems to determine whether better systems are currently available, and subsequent efforts to associate with such preferred systems. The access terminal 206 may limit the search for specific band and channel. For example, the search for the most preferred system may be repeated periodically. Upon discovery of a preferred femto node 211, the access terminal 206 selects the femto node 211 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 211 that reside within the corresponding user residence 208). In some implementations, a node may be restricted to not provide signaling, data access, registration, paging or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access terminals/subscribers to which access to the restricted femto node is allowed. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

Figure 3:
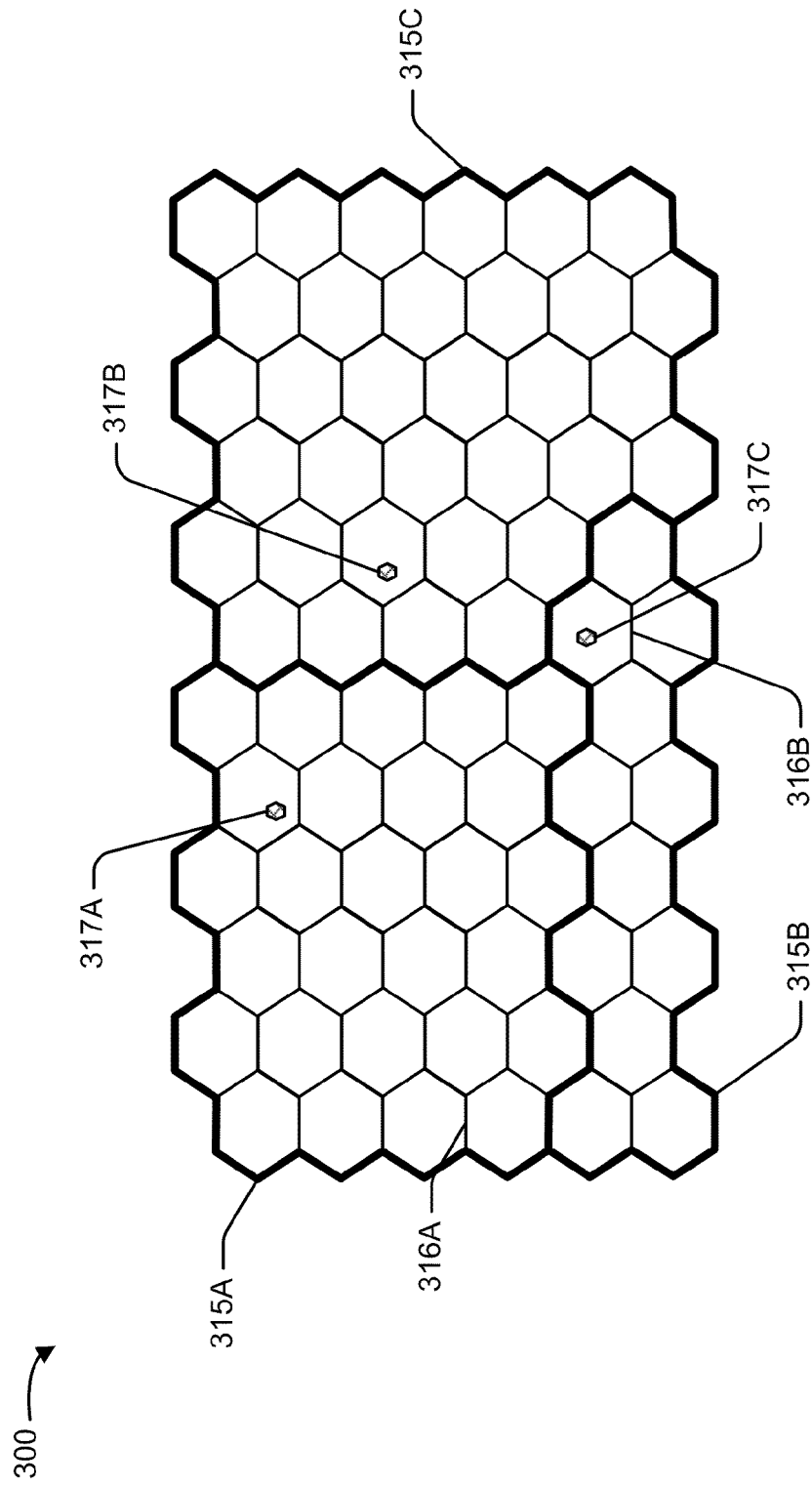
FIG. 3 illustrates an example of a coverage map where several tracking areas (or routing areas or location areas) are defined, each of which includes several macro coverage areas.

FIG. 3 illustrates an example of a coverage map 300 where several tracking areas 315 (or routing areas or location areas) are defined, each of which includes several macro coverage areas 316. Here, areas of coverage associated with tracking areas 315A, 315B and 315C are delineated by the wide lines and the macro coverage areas 316A and 316B are represented by the hexagons. The tracking areas 315 also include femto coverage areas 317A, 317B and 317C. In this example, each of the femto coverage areas 317 (e.g., femto coverage area 317C) is depicted within a macro coverage area 316 (e.g., macro coverage area 316B). It should be appreciated, however, that a femto coverage area 317 may not lie entirely within a macro coverage area 316. In practice, a large number of femto coverage areas 317 may be defined with a given tracking area 315 or macro coverage area 316. Also, one or more pico coverage areas (not shown) may be defined within a given tracking area 315 or macro coverage area 316.

Figure 4:
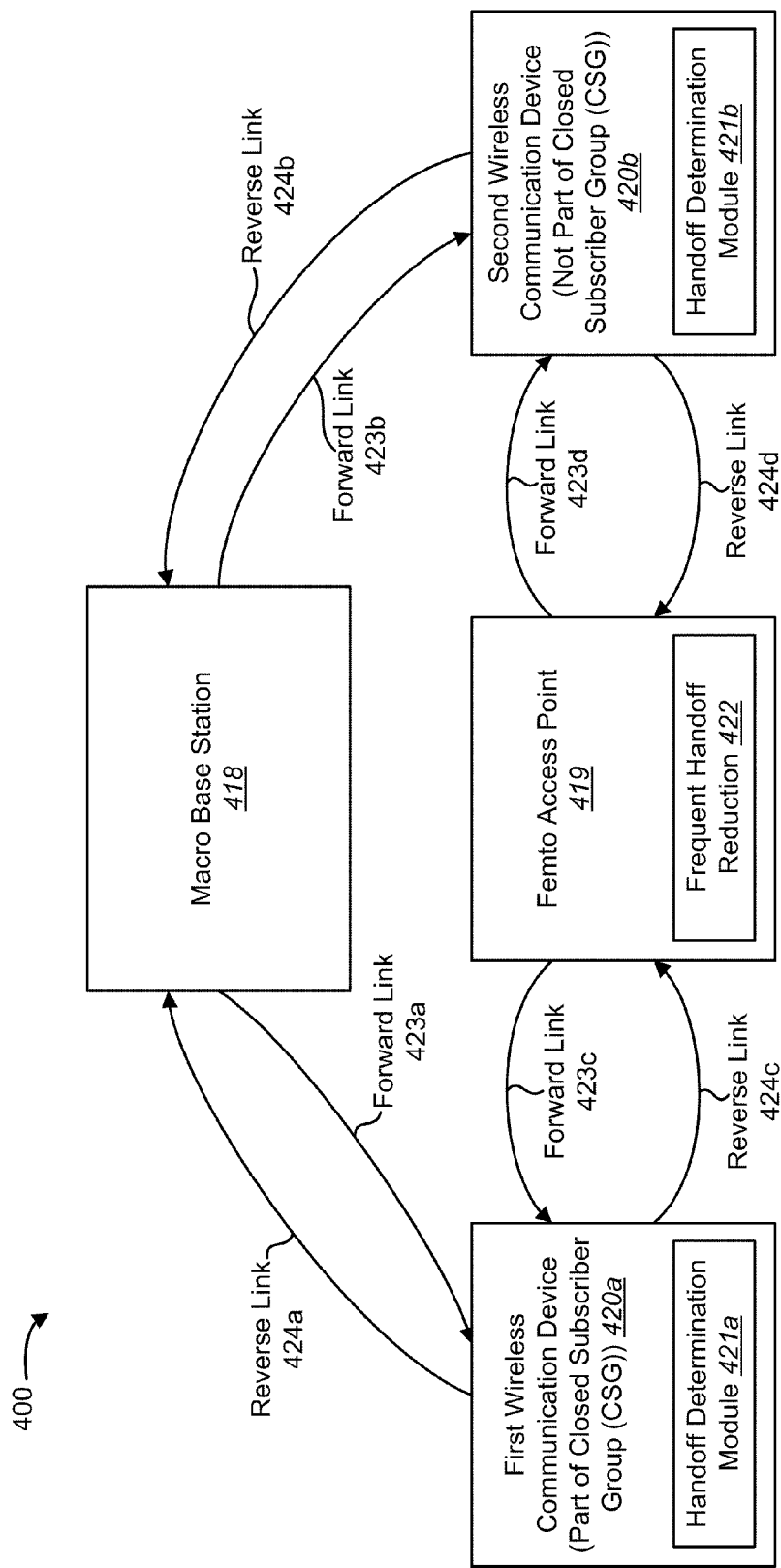
FIG. 4 shows a wireless communication system with multiple wireless devices.

FIG. 4 shows a wireless communication system 400 with multiple wireless devices. Wireless communication systems 400 are widely deployed to provide various types of communication content such as voice, data, and so on. These systems may be multiple-access systems capable of supporting communication with multiple users by sharing the available system resources (e.g., bandwidth and transmit power). A wireless device may be a base station or a wireless communication device.

A base station is a station that communicates with one or more wireless communication devices. A base station may also be referred to as, and may include some or all of the functionality of, an access point, a broadcast transmitter, a NodeB, an evolved NodeB, etc. The term "base station" will be used herein. Each base station provides communication coverage for a particular geographic area. A base station may provide communication coverage for one or more wireless communication devices. The term "cell" can refer to a base station and/or its coverage area depending on the context in which the term is used.

A mobile station or device may be referred to as a wireless communication device. A base station may be referred to as an evolved NodeB (eNB). A semi-autonomous base station may be referred to as a home evolved NodeB (HeNB). An HeNB may thus be one example of an eNB. The HeNB and/or the coverage area of an HeNB may be referred to as a femtocell, a picocell, a home NodeB (HNB) cell, an HeNB cell, a femto access point, a femto node or a closed subscriber group (CSG) cell. Femto access point terminology is used hereinafter. Femto access points are low power base stations that extend the range of conventional wide area network base stations. Femto access points provide voice and high speed data service inside homes and offices for wireless communication devices supporting cellular radio communication techniques. Access to a femto access point depends on the kind of access control that the femto access point uses. With open access, any wireless communication device can access and receive service from a femto access point. With closed subscriber group (CSG) or restricted access, only members of the closed subscriber group (CSG) are allowed to access and receive service from a femto access point 419.

Communications in a wireless system (e.g., a multiple-access system) may be achieved through transmissions over a wireless link. Such a communication link may be established via a single-input and single-output (SISO), multiple-input and single-output (MISO), or a multiple-input and multiple-output (MIMO) system. A MIMO system includes transmitter(s) and receiver(s) equipped, respectively, with multiple (NT) transmit antennas and multiple (NR) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

A MIMO system may support time division duplex (TDD) and frequency division duplex (FDD). In a TDD system, the uplink and downlink transmissions are on the same frequency region so that the reciprocity principle allows the estimation of the uplink channel from the downlink channel.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems or other multiple access techniques.

A wireless communication system employing the teachings herein may be designed to implement one or more standards, such as IS-95, cdma2000, IS-856, W-CDMA, time division synchronous code division multiple access (TD-SCDMA) and other standards. A CDMA network may implement a radio technology such as Universal Terrestrial Radio Access (UTRA), cdma2000 or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). The teachings herein may be implemented in a Third Generation Partnership Project (3GPP) Long Term Evolution (LTE) system, an Ultra-Mobile Broadband (UMB) system and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (IxRTT, 1xEV-DO Re1O, RevA, RevB) technology and other technologies. For clarity, certain aspects of the techniques are described below for cdma2000, and cdma2000 terminology is used in much of the description below.

Low power base stations such as home NodeBs (HNBs), home evolved NodeBs (HeNB), picocells and femtocells are used in addition to the normal base stations (a normal base station is referred to herein as a macro base station 418). A picocell may refer to a base station controlled by the network operator that operates on a much smaller scale than a macro base station. A femtocell may refer to a base station controlled by a consumer that operates on a much smaller scale than a macro base station. A femtocell may provide service to a closed subscriber group (CSG). HNBs, HeNBs, picocells and femtocells are referred to herein as femto access points 419.

A femto access point 419 may provide benefits to a subscriber in the form of improved coverage inside the house/office and the possibility of special pricing plans. For example, an operator may provide unlimited voice/data usage when the user is using a femto access point 419 for a nominal charge. The operator may benefit from additional system capacity made available by offloading some of the traffic to femto access points 419.

From both a user and an operator perspective, it is desirable to maximize usage of a femto access point. When a user comes home, a wireless communication device 420 should perform idle handoff from a macro base station 418 to the femto access point 419 so that the user can initiate/receive calls using the femto access point 419. While moving around the home, the wireless communication device 420 may stay in idle mode (camp) on the femto access point 419 as long as the coverage of the femto access point 419 is adequate. A good mechanism is needed to control idle handoff by a wireless communication device 420, make a wireless communication device 420 stay connected to a femto access point 419 in idle mode and/or active mode longer (i.e. "stick to the femto access point 419") and prevent frequent idle handoffs between a femto access point 419 and a macro base station 418 in cdma2000 systems.

A base station may communicate with one or more wireless communication devices 420*a-b*. A wireless communication device 420 may also be referred to as, and may include some or all of the functionality of, a terminal, an access terminal, a user equipment (UE), a subscriber unit, a station, etc. A wireless communication device 420 may be a cellular phone, a personal digital assistant (PDA), a wireless device, a wireless modem, a handheld device, a laptop computer, etc. A wireless communication device 420 may communicate with zero, one or multiple base stations on the forward link 423*a-d* and/or reverse link 424*a-d* at any given moment. The forward link 423 (or downlink) refers to the communication link from a base station to a wireless communication device 420 and the reverse link 424 (or uplink) refers to the communication link from a wireless communication device 420 to a base station.

A first wireless communication device 420*a* may be part of a closed subscriber group (CSG) associated with the femto access point 419. The femto access point 419 may allow access only to wireless communication devices 420 that are part of the closed subscriber group (CSG). With signaling only access, wireless communication devices 420 that are not part of a closed subscriber group (CSG) are allowed to exchange signaling messages with the core network using the femto access point 419. However, in signaling only access, the wireless communication devices 420 that are not part of the closed subscriber group (CSG) are not allowed active mode voice/data service from the femto access point 419.

The first wireless communication device 420*a* may switch between communicating with a macro base station 418 and communicating with the femto access point 419. Because the first wireless communication device 420*a* is part of the closed subscriber group (CSG) associated with the femto access point 419, it may be desirable for the first wireless communication device 420*a* to communicate with the femto access point 419 as long as coverage by the femto access point 419 is adequate. This way, the femto access point 419 usage may be maximized. When the first wireless communication device 420*a* enters the coverage area of the femto access point 419, the first wireless communication device 420*a* may perform an idle handoff from the macro base station 418 to the femto access point 419 so that the first wireless communication device 420*a* can initiate/receive calls using the femto access point 419. An idle handoff refers to a handoff from one base station to another when a wireless communication device 420 is not in an active call.

When the coverage of the femto access point 419 is not adequate for the first wireless communication device 420a, the first wireless communication device 420a may perform an idle handoff from the femto access point 419 to the macro base station 418. Typically, a wireless communication device 420 such as a cdma2000 1x mobile will wake up periodically to scan forward link 423 pilot signals from other base stations. If the forward link 423 pilot signal strength from another base station is greater than the forward link 423 pilot signal strength of the current serving base station by a certain threshold (using hysteresis), which is typically around 3 decibels (dB), then the wireless communication device 420 will perform an idle handoff to the other base station.

A deep channel fade on the forward link 423 of the femto access point 419 to the first wireless communication device 420a may trigger the idle handoff. If the forward link 423c signal strength of the femto access point 419 and the forward link 423a signal strength of the macro base station 418 have similar average values, the first wireless communication device 420a may handoff back and forth between the femto access point 419 and the macro base station 418. These frequent idle handoffs can drain the battery of the first wireless communication device 420a. Frequent idle handoffs can also increase the network signaling load, because the wireless communication device 420 performs a registration with the network each time the wireless communication device 420 performs an idle handoff. To avoid frequent idle handoffs between the femto access point 419 and the macro base station 418, the first wireless communication device 420a may use a handoff determination module 421a. The handoff determination module 421a is discussed in further detail below in relation to FIG. 12.

The second wireless communication device 420b may not be part of the closed subscriber group (CSG) associated with the femto access point 419. However, the second wireless communication device 420b may be located nearby the femto access point 419. The second wireless communication device 420b may receive communications from the macro base station 418 via a forward link 423b and send communications to the macro base station 418 via a reverse link 424b.

Like the first wireless communication device 420a, the second wireless communication device 420b may periodically wake-up to scan pilots from other base stations (i.e., to measure the forward link 423d pilot signal strength from the femto access point 419 to the second wireless communication device 420b). If the forward link 423d pilot signal strength from the femto access point 419 is greater than the forward link 423b pilot signal strength received from the macro base station 418, the second wireless communication device 420b may attempt an idle handoff from the macro base station 418 to the femto access point 419. Even though this idle handoff may be denied (because the second wireless communication device 420b is not part of the closed subscriber group (CSG) associated with the femto access point 419), an idle handoff attempt may still burden network resources. To avoid frequent idle handoff attempts between the macro base station 418 and the femto access point 419, the second wireless communication device 420b may use a handoff determination module 421b. The handoff determination module 421b is discussed in further detail below in relation to FIG. 12.

The femto access point 419 may attempt to prevent frequent idle handoffs from wireless communication devices 420 that are part of the closed subscriber group (CSG) associated with the femto access point 419 (i.e., the first wireless communication device 420a) and wireless communication devices 420 that are not part of the closed subscriber group (CSG) associated with the femto access point 419 (i.e., the second wireless communication device 420b) using a frequent handoff reduction module 422. The frequent handoff reduction module 422 is discussed in further detail below in relation to FIG. 5.

Upon detecting frequent handoffs by the first wireless communication device 420a, the frequent handoff reduction module 422 may increase the transmit power of the femto access point 419 to increase the coverage area of the femto access point 419 and bring the first wireless communication device 420a out of the frequent handoff cycle. Upon detecting frequent handoffs by the second wireless communication device 420b, the frequent handoff reduction module 422 may reduce the transmit power of the femto access point 419 to decrease the coverage area of the femto access point 419 and bring the second wireless communication device 420b out of the frequent handoff cycle.

Figure 5:
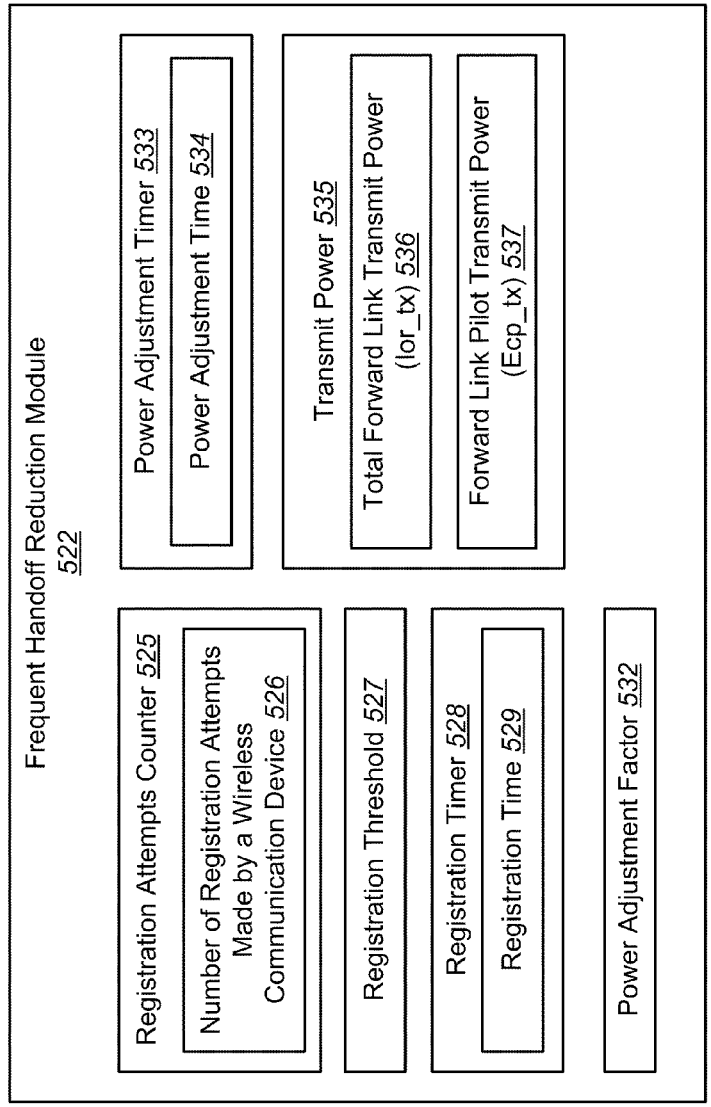
FIG. 5 is a block diagram of a frequent handoff reduction module.

FIG. 5 is a block diagram of a frequent handoff reduction module 522. The frequent handoff reduction module 522 of FIG. 5 is one configuration of the frequent handoff reduction module 422 of FIG. 4. The frequent handoff reduction module 522 may be on a femto access point 419. The frequent handoff reduction module 522 may include a registration attempts counter 525. The registration attempts counter 525 may count the number 526 of registration attempts made by one or more wireless communication devices over a certain time period (e.g., N hours or N days).

In idle mode (no active, ongoing voice/data session), a wireless communication device 420 (such as a cdma2000 mobile station) will turn off all its circuitry and enter a sleep state most of the time to conserve battery life. The wireless communication device 420 wakes up periodically to monitor any incoming pages from the network. When the wireless communication device 420 wakes up, it performs intra-frequency and inter-frequency searches to find neighboring base stations using a list (e.g., a Neighbor List Message) provided by the current serving base station.

Neighboring base stations on the same frequency as the current serving base station are searched more often. Different frequencies are searched only when the forward link 423 power ratio Ecp/Io from the current serving base station falls below a certain threshold (Ecp=received pilot signal power from a particular base station, Io=total received signal power including noise). An idle handoff registration attempt is performed if the forward link 423 power ratio Ecp/Io from a non-serving base station is better than the forward link 423 power ratio Ecp/Io from the current serving base station point by some hysteresis margin. Additional criteria may be followed by the wireless communication device 420 to perform handoff.

Every idle handoff registration attempt may not be successful. For example, the non-serving base station may use access constraints that prevent certain wireless communication devices 420 (that are not part of the closed subscriber group (CSG) associated with the non-serving base station) from performing an idle handoff to the non-serving base station. The wireless communication device 420 may attempt an idle handoff registration but be denied by the non-serving base station. Idle handoff registration attempts that are denied are still counted by the registration attempts counter 525.

The frequent handoff reduction module 522 may also include a registration threshold 527. The registration threshold 527 may be a predefined threshold that limits the number 526 of registration attempts made by a wireless communication device 420 before the femto access point 419 takes action to reduce the frequent handoffs. The frequent handoff reduction module 522 may include a different registration threshold 527 for wireless communication devices 420 that are part of the closed subscriber group (CSG) associated with the femto access point 419 than for wireless communication devices 420 that are not part of the closed subscriber group (CSG).

The frequent handoff reduction module 522 may also include a registration timer 528 with a registration time 529. The frequent handoff reduction module 411 may count the number 526 of registration attempts made by a wireless communication device 420 while the registration timer 528 is running and compare the number 526 of registration attempts with the registration threshold 527. The frequent handoff reduction module 522 may then increase/decrease a transmit power 535 of the femto access point 419 if the number of registration attempts is greater than the registration threshold 527. When increasing/decreasing the transmit power 535, changes may be made to the total forward link transmit power (Ior_tx) 536 or to the forward link pilot transmit power (Ecp_tx) 537. Changes made to the total forward link transmit power (Ior_tx) 536 may also change the forward link pilot transmit power (Ecp_tx) 537 because the pilot power gain is relative to the total transmit power. As an example, in current macro base stations 418, the forward link pilot transmit power 537 is ~20% and the overhead channel power is ~15% of the total available transmit power. The remaining power is reserved to serve a large number of users under the macro base station 418 coverage. However, the number of users that a femto access point 419 is likely to serve is very limited (around four or five). Therefore, a larger fraction of power can be allocated to pilot and overhead channels.

The frequent handoff reduction module 522 may include a power adjustment factor 532 and a power adjustment timer 533 with a power adjustment time 534. The power adjustment factor 532 may be a configurable factor that adjusts the transmit power 535 of the femto access point 419 up or down (e.g., 2 dB up or 2 dB down). The power adjustment factor 532 may adjust the total forward link transmit power 536 or the forward link pilot transmit power 537. Power adjustment factors 532 and the power adjustment timer 533 are discussed in additional detail below in relation to FIG. 10.

Figure 6:
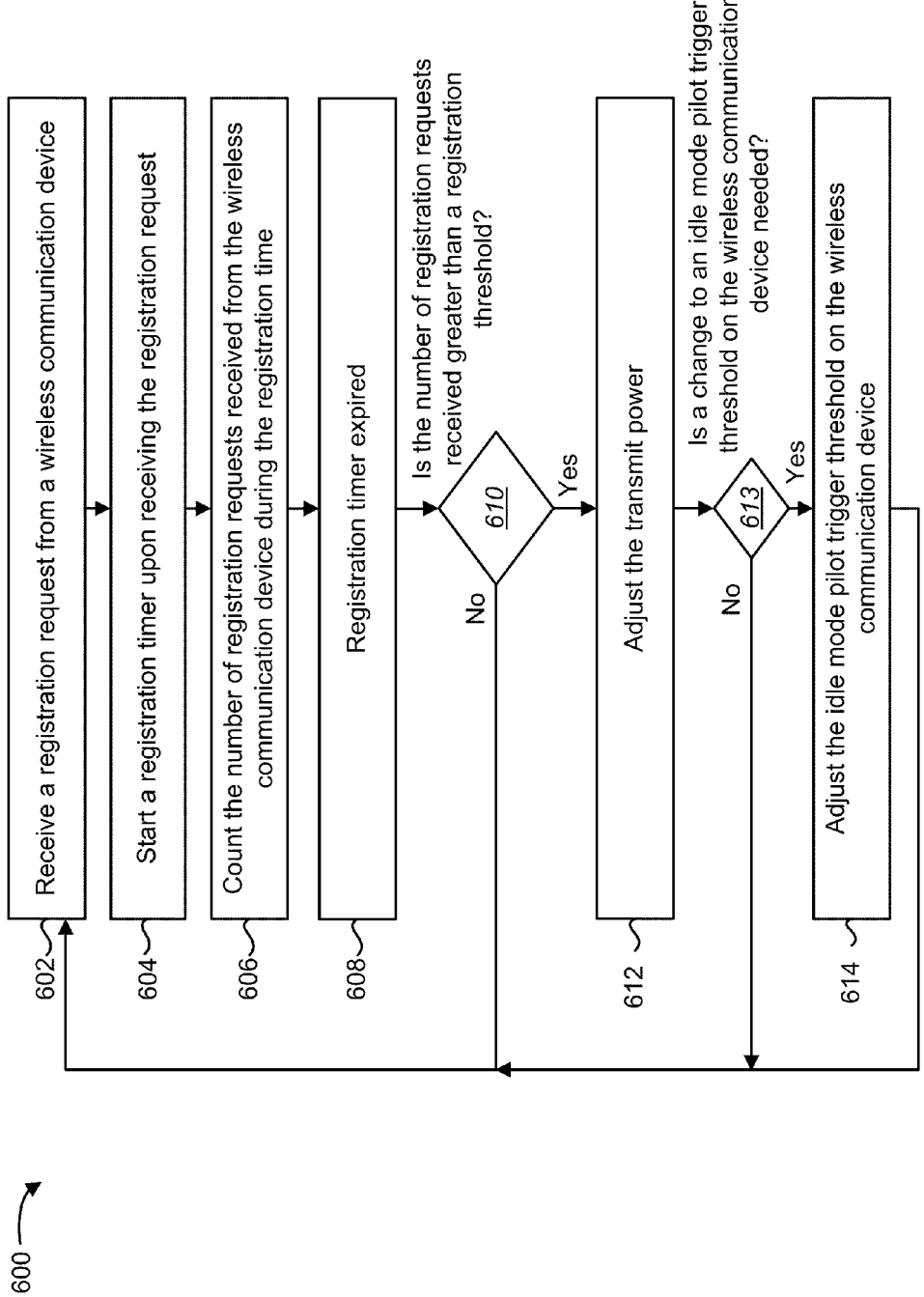
FIG. 6 is a flow diagram of a method for reducing frequent handoffs.

FIG. 6 is a flow diagram of a method 600 for reducing frequent handoffs. The method 600 may be performed by a femto access point 419. The femto access point 419 may receive 602 a registration request from a wireless communication device 420. The wireless communication device 420 may or may not belong to a closed subscriber group (CSG) associated with the femto access point 419. The wireless communication device 420 may perform an idle handoff from a macro base station 418 to the femto access point 419 by first sending a registration request to the femto access point 419. Upon receiving 602 the registration request, the femto access point 419 may start 604 a registration timer 528.

The femto access point 419 may count 606 the number 526 of registration requests received from the wireless communication device 420 during the registration time 529. Once the registration timer 528 has expired 608, the femto access point 419 may then determine 610 whether the number 526 of registration requests received from the wireless communication device 420 is greater than a registration threshold 527. If the number 526 of registration requests received from the wireless communication device 420 is not greater than the registration threshold 527, the femto access point 419 may wait to receive 602 another registration request from a wireless communication device 420.

If the number 527 of registration requests received from the wireless communication device 420 is greater than the registration threshold 527, the femto access point 419 may adjust 612 the transmit power 535 of the femto access point 419 accordingly. In one configuration, adjusting 612 the transmit power 535 may include adjusting the total forward link transmit power (Ior_tx) 536, which also adjusts the forward link pilot transmit power (Ecp_tx) 537, since the pilot power gain is relative to the total forward link transmit power (Ior_tx) 536. In another configuration, adjusting 612 the transmit power 535 may include only adjusting the forward link pilot transmit power (Ecp_tx) 537. Adjusting 612 the transmit power 535 may include increasing and decreasing the transmit power 535.

In one configuration, the femto access point 419 may detect active handoffs of a wireless communication device 420. Upon detecting an active handoff (active handoffs are signaled via the core network), the femto access point 419 may start a registration timer 528 and count the number of active handoffs (or active handoff attempts) by the wireless communication device 420 during the registration time 529. If frequent active handoffs are detected over the registration time 529, the femto access point 419 may adjust 612 the transmit power 535.

The femto access point 419 may then determine 613 whether a change to an idle mode pilot trigger threshold on the wireless communication device 420 is needed. The idle mode pilot trigger threshold is discussed in additional detail below in relation to FIG. 12. The idle mode pilot trigger threshold may be an adjustable threshold used by the wireless communication device 420 to determine when to search for pilot signals from other base stations while in idle mode. The femto access point may adjust 614 an idle mode pilot trigger threshold on the wireless communication device 420 if a change to the idle mode pilot trigger threshold is needed. If a change to the idle mode pilot trigger threshold on the wireless communication device 420 is not needed, the femto access point may return to waiting to receive 602 another registration request from a wireless communication device 420.

Adjusting 614 the idle mode pilot trigger threshold on the wireless communication device 420 may cause the wireless communication device 420 to delay searches for other base stations, thereby causing the wireless communication device 420 to stay on the femto access point 419 longer. Thus, frequent idle handoff effects are naturally reduced. Adjusting 614 an idle mode pilot trigger threshold on the wireless communication device 420 may include sending instructions to the wireless communication device 420 that include changes to the idle mode pilot trigger threshold.

Adjusting 614 an idle mode pilot trigger threshold on the wireless communication device 420 may be done proactively or upon detection of frequent idle handoffs based on registration attempts. The femto access point 419 may only adjust 614 an idle mode pilot trigger threshold on the wireless communication device 420 if such adjustable controls are available to the femto access point 419. Though such capability does not exist in current cdma2000 femto access points 419, this is likely to be available in the future. However, this solution readily applies to WCDMA systems where separate thresholds are provided to trigger intra-frequency or inter-frequency pilot searches. The femto access point 419 may then wait to receive 602 another registration request from a wireless communication device 420.

Femto access points such as cdma2000 1x femtocells can transmit beacons on frequencies different from the normal operating forward link frequency when the femtocell forward link frequency is different from the neighboring macro base station frequencies. In such a case, a wireless communication device performs an idle hand-in from a macro base station to a femtocell via a beacon, but performs inter-frequency idle hand-out directly from the femtocell to the macro base station without any beacons. Thus, to avoid frequent handoffs, the femtocell may adjust the power level of beacon transmissions in conjunction with adjusting the transmit power level of the normal operating forward link frequency.

Figure 7:
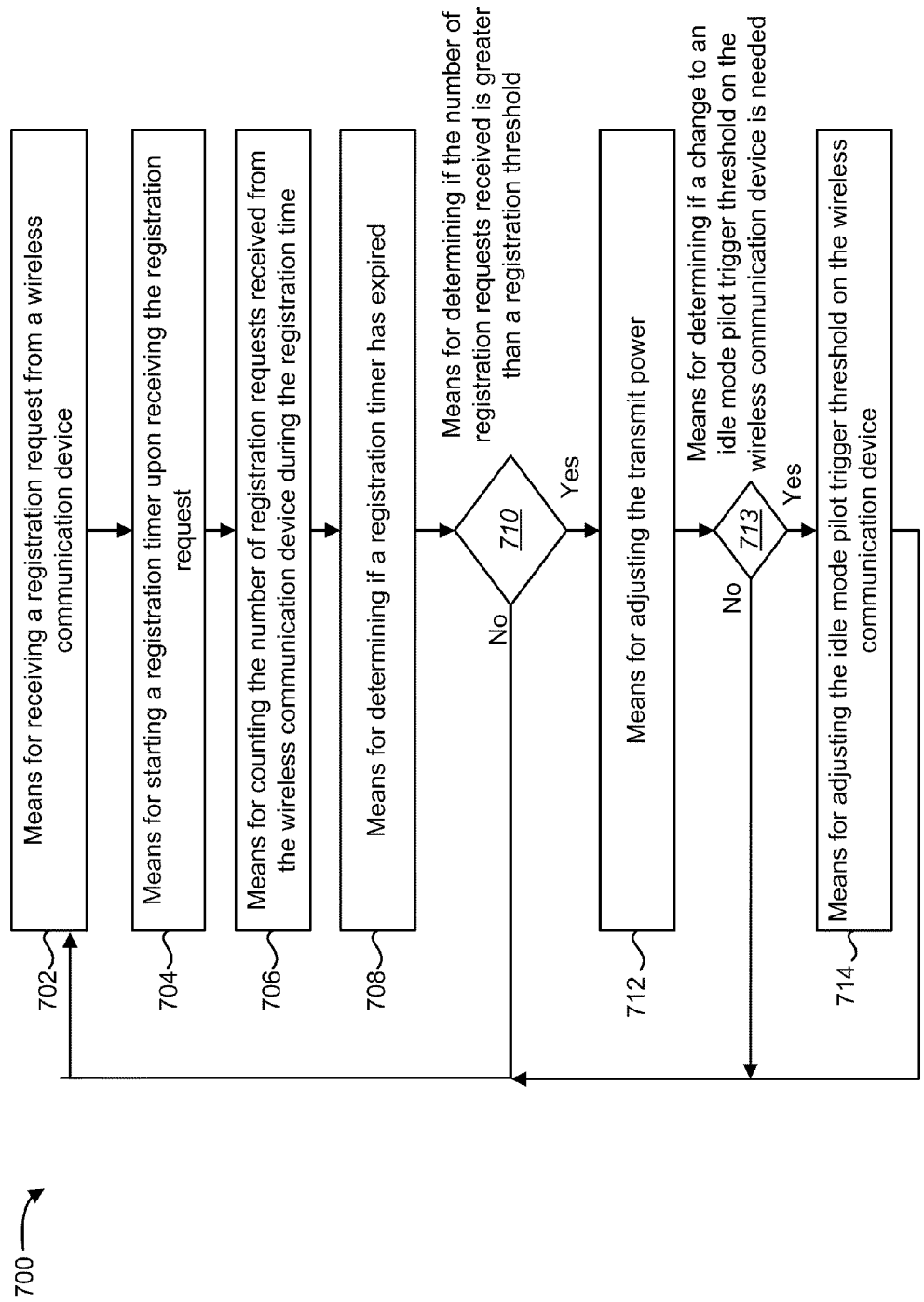
FIG. 7 illustrates means-plus-function blocks corresponding to the method of FIG. 6.

The method 600 of FIG. 6 described above may be performed by various hardware and/or software component(s) and/or module(s) corresponding to the means-plus-function system 700 illustrated in FIG. 7. In other words, blocks 602 through 614 illustrated in FIG. 6 correspond to means-plus-function blocks 702 through 714 illustrated in FIG. 7. For example, system 700 can reside at least partially within a base station, or mobile device, etc. It is to be appreciated that system 700 is represented as including functional blocks, which can represent functions implemented by a processor, software, or combination thereof, such as, for example, firmware. Additionally, the system 700 may include a memory (not shown) that retains instructions for executing functions associated with blocks 702 through 714.

Figure 8:
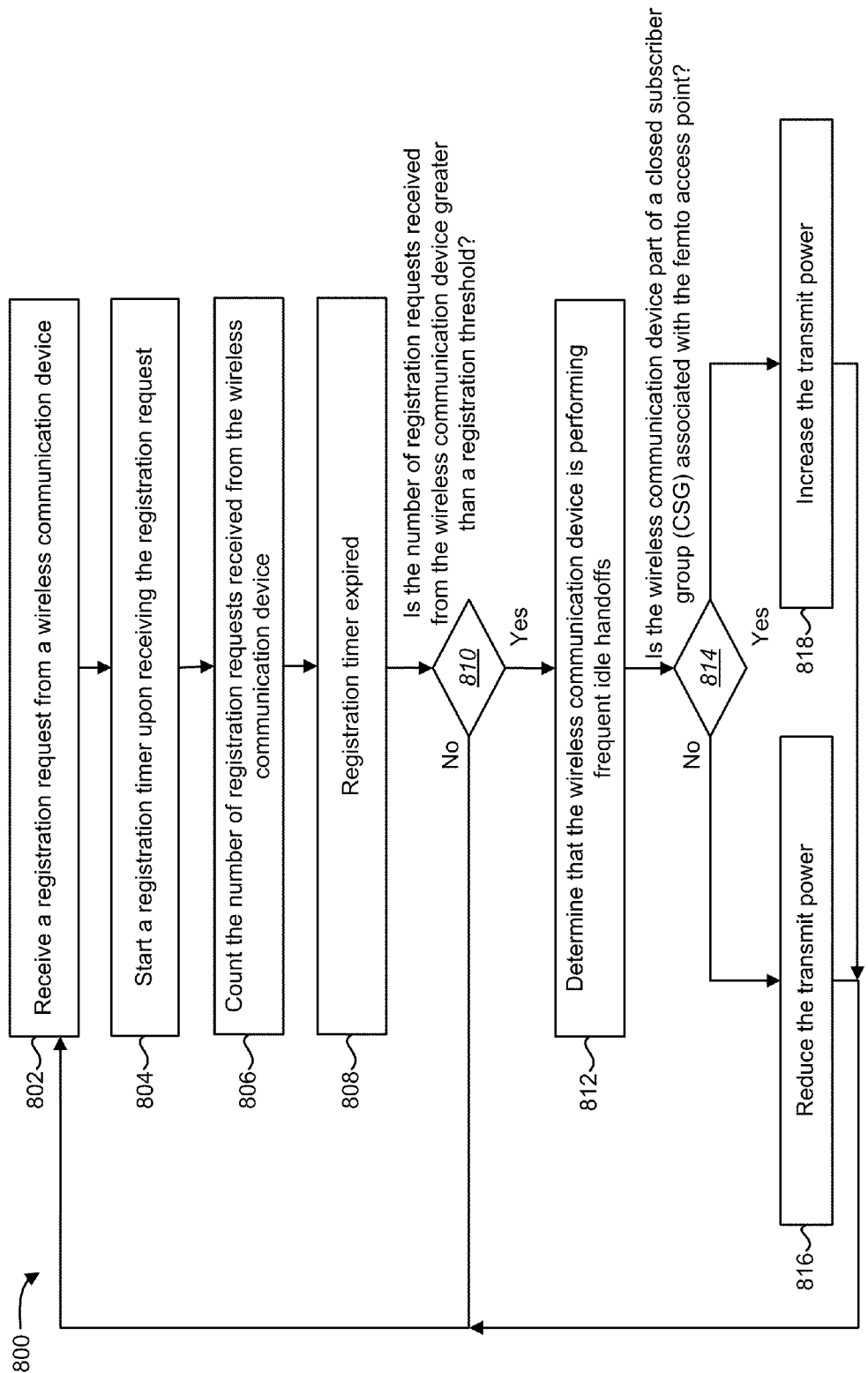
FIG. 8 is another flow diagram of a method for reducing frequent handoffs.

FIG. 8 is another flow diagram of a method 800 for reducing frequent handoffs. The method 800 may be performed by a femto access point 419. The femto access point 419 may receive 802 a registration request from a wireless communication device 420. The wireless communication device 420 may or may not be part of the closed subscriber group (CSG) associated with the femto access point 419. When a wireless communication device 420 performs idle handoff from a macro base station 418 to a femto access point 419, the wireless communication device 420 sends a registration request to the femto access point 419. Upon receiving the registration request, the femto access point 419 may start 804 a registration timer 528.

The femto access point 419 may then count 806 the number 526 of registration requests received from the wireless communication device 420 until the registration timer 528 expires 808. The femto access point 419 may compare 810 the number 526 of registration requests received from the wireless communication device 420 with a registration threshold 527. If the number 526 of registration requests received from the wireless communication device 420 is not greater than the registration threshold 527, the femto access point 419 may wait to receive 802 another registration request from a wireless communication device 420.

If the number 526 of registration requests received from the wireless communication device 420 is greater than the registration threshold 527, the femto access point 419 may determine 812 that the wireless communication device 420 is performing frequent idle handoffs. As an example, the registration time 529 can be set to two minutes and the registration threshold 527 can be set to five. If more than five registration attempts from the wireless communication device 420 are detected during the two minute registration timer 529, the femto access point 419 may determine 812 that the wireless communication device 420 is performing frequent idle handoffs. As another example, the registration time 529 can be set to two hours and the registration threshold 527 can be set to fifty. If more than fifty registration attempts from the wireless communication device 420 are detected during the two hour registration timer 529, the femto access point 419 may determine 812 that the wireless communication device 420 is performing frequent idle handoffs. Overall, the registration timer 528 and the registration threshold 527 can be configured and optimized to reduce frequent handoffs.

The femto access point 419 may then determine 814 whether the wireless communication device 420 is part of a closed subscriber group (CSG) associated with the femto access point 419. If the wireless communication device 420 is part of a closed subscriber group (CSG) associated with the femto access point 419, it may be desirable to make the wireless communication device 420 stick to the femto access point 419. In other words, it may be desirable that the wireless communication device 420 communicate with the femto access point 419 for as long as possible. The femto access point 419 may thus increase 818 the transmit power 535 to improve forward link coverage and thereby prevent frequent handoffs of a wireless communication device 420 that is part of a closed subscriber group (CSG) associated with the femto access point 419. In one configuration, the femto access point 419 may increase 818 the transmit power 535 by a power adjustment factor 532. Power adjustment factors 532 are discussed in further detail below in relation to FIG. 10. In one configuration, the femto access point 419 may increase 818 the transmit power 535 on the forward link pilot channel Walsh code by a few dBs.

In one configuration, the femto access point 419 may proactively choose to adjust the transmit power 535 to adjust the coverage area of the femto access point 419. This technique is especially useful when femto access points 419 have a dedicated frequency different from neighboring macro base stations 418 because a higher pilot and overhead power will not cause interference to the macro network, but will provide good femto access point 419 coverage to delay idle handoffs.

Depending on the available transmit power 535 headroom, the femto access point 419 may increase the total forward link transmit power (Ior_tx) 536 (which also increases the forward link pilot transmit power (Ecp_tx) 537, since pilot power gain is relative to the total transmit power) or only the forward link pilot transmit power (Ecp_tx) 537 by adjusting the pilot channel gain. Increasing either the total forward link transmit power (Ior_tx) 536 or only the forward link pilot transmit power (Ecp_tx) 537 may cause signals received by the wireless communication device 420 from a macro base station 418 to be weaker than signals received by the wireless communication device 420 from the femto access point 419. This may reduce the idle handoffs of the wireless communication device 420. The femto access point 419 may then wait to receive 802 another registration request from a wireless communication device 420.

If the wireless communication device 420 is not part of a closed subscriber group (CSG) associated with the femto access point 419, it may be desirable to force the wireless communication device 420 out of the coverage area of the femto access point 419. The femto access point 419 may thus reduce 816 the transmit power 535. The femto access point 419 may reduce the total forward link transmit power (Ior_tx) 536 or only the forward link pilot transmit power (Ecp_tx) 537 to force the wireless communication device 420 out of the coverage area of the femto access point 419. In one configuration, the femto access point 419 may reduce 816 the transmit power 535 by a power adjustment factor 532. Power adjustment factors 532 are discussed in further detail below in relation to FIG. 10. The femto access point 532 may then wait to receive 802 another registration request from a wireless communication device 420.

Figure 9:
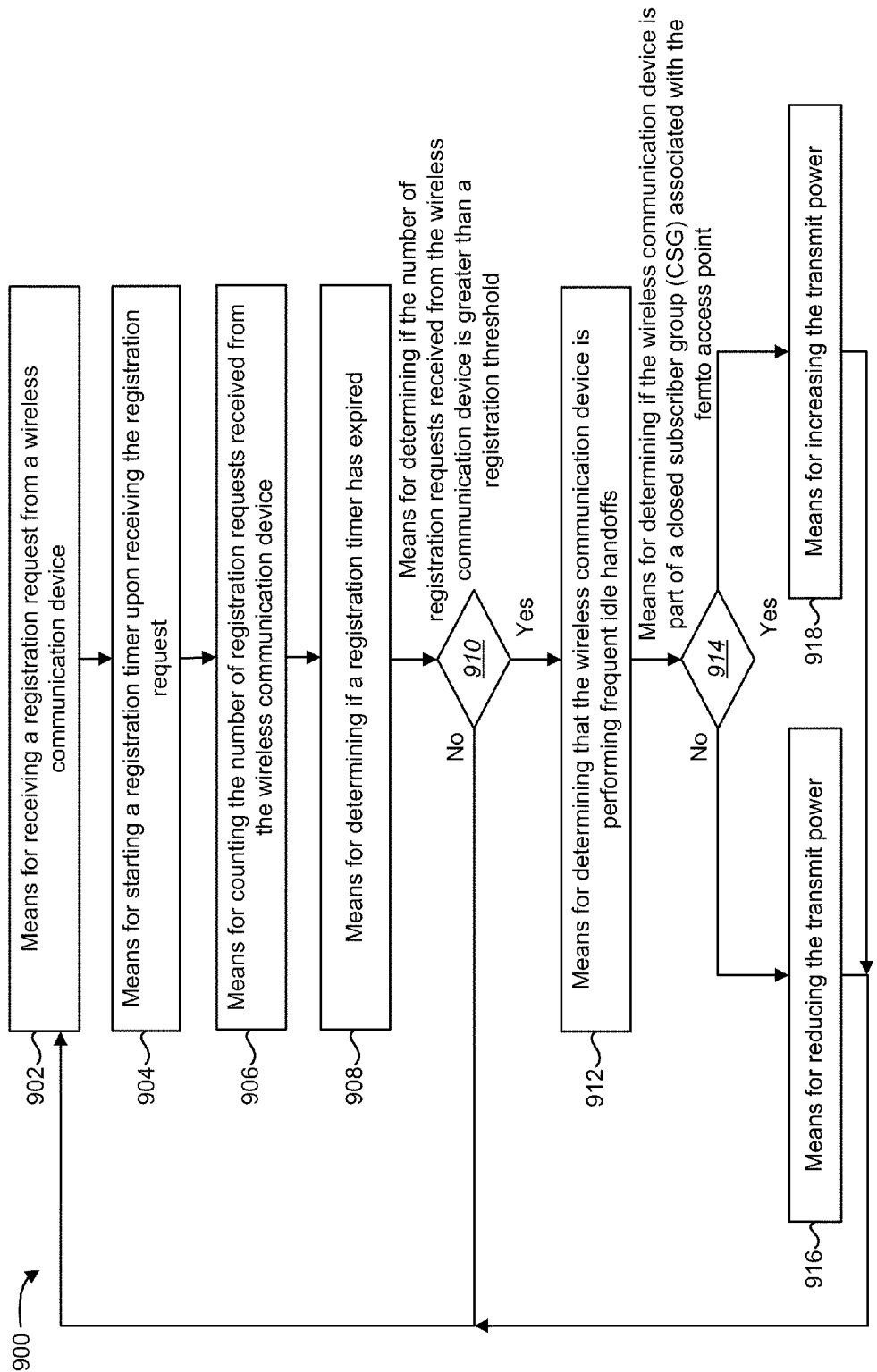
FIG. 9 illustrates means-plus-function blocks corresponding to the method of FIG. 8.

The method 800 of FIG. 8 described above may be performed by various hardware and/or software component(s) and/or module(s) corresponding to the means-plus-function system 900 illustrated in FIG. 9. In other words, blocks 802 through 818 illustrated in FIG. 8 correspond to means-plus-function blocks 902 through 918 illustrated in FIG. 9. For example, system 900 can reside at least partially within a base station, or mobile device, etc. It is to be appreciated that system 900 is represented as including functional blocks, which can represent functions implemented by a processor, software, or combination thereof, such as, for example, firmware. Additionally, the system 900 may include a memory (not shown) that retains instructions for executing functions associated with blocks 902 through 918.

Figure 10:
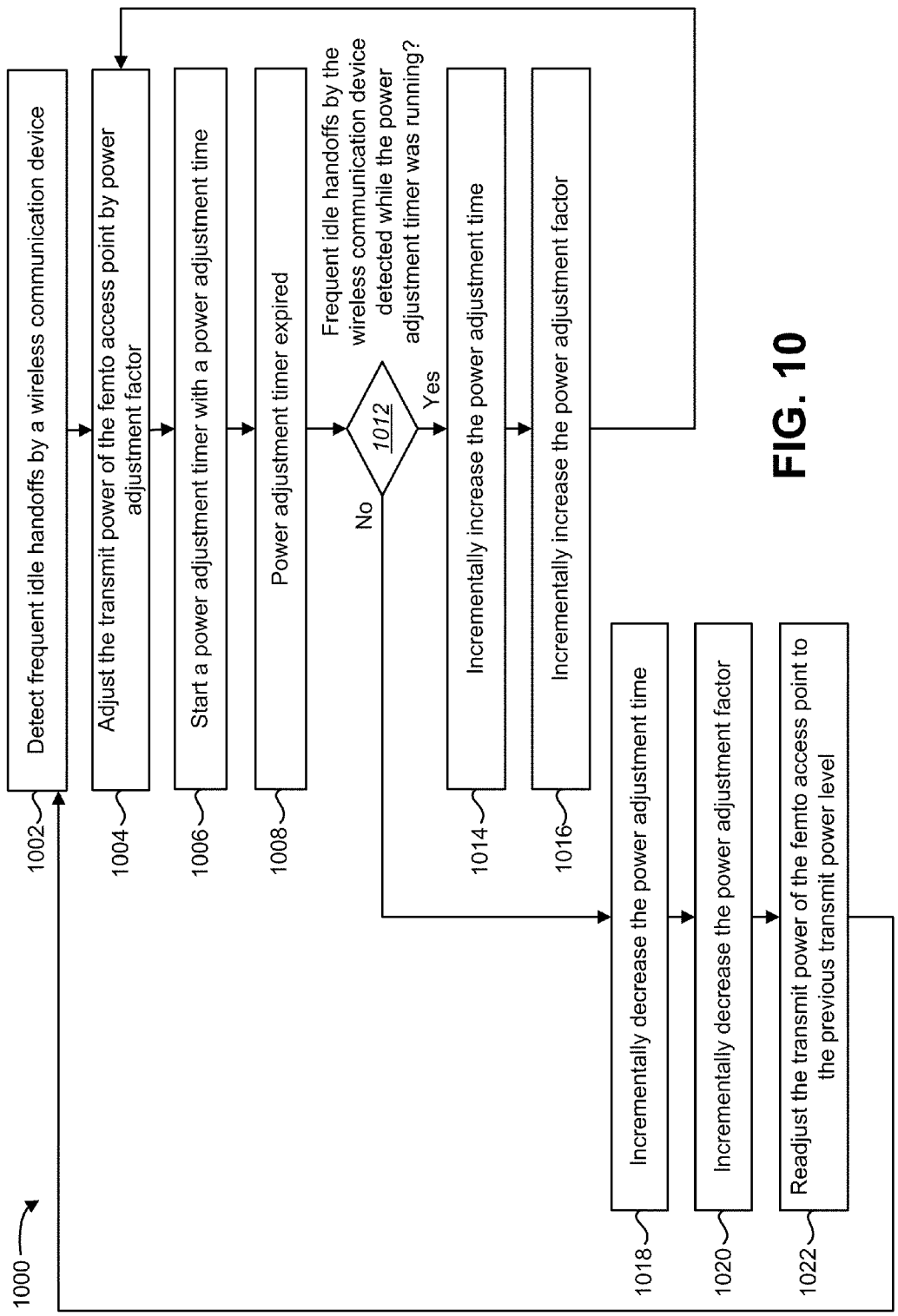
FIG. 10 is a flow diagram of yet another method for reducing frequent handoffs.

FIG. 10 is a flow diagram of yet another method 1000 for reducing frequent handoffs. The method 100 may be performed by a femto access point 419. The femto access point 419 may detect 1002 frequent idle handoffs by a wireless communication device 420. In one configuration, the femto access point 419 may detect 1002 frequent idle handoffs by a wireless communication device 420 by counting the number 526 of registration attempts made by the wireless communication device 420. The femto access point 419 may then adjust 1004 the transmit power 535 of the femto access point 419 by a power adjustment factor 532. As discussed above in relation to FIG. 5, the femto access point 419 may increase or decrease either the total forward link transmit power (Ior_tx) 536 or only the forward link pilot transmit power (Ecp_tx) 537. Power is increased if wireless communication devices 420 that are part of the closed subscriber group (CSG) associated with the femto access point 419 are performing frequent idle handoffs, thereby improving the forward link coverage area of the femto access point 419. Power is decreased if wireless communication devices 420 that are not part of the closed subscriber group (CSG) associated with the femto access point 419 are performing frequent idle handoffs, thereby shrinking the forward link coverage area of the femto access point 419.

Power adjustments are only done for a certain duration (e.g., ten minutes) so as to not affect normal coverage by the femto access point 419. Thus, the femto access point 419 may start 1006 a power adjustment timer 533 after adjusting 1004 the transmit power of the femto access point 419 by the power adjustment factor 532. Once the power adjustment timer 533 has expired 1008, the femto access point 419 may determine 1012 whether frequent idle handoffs by the wireless communication device 420 were detected while the power adjustment timer 533 was running. If frequent idle handoffs by the wireless communication device 420 were detected while the power adjustment timer 533 was running, the femto access point 419 may incrementally increase 1014 the power adjustment time 534 (i.e., from ten minutes to fifteen minutes, then twenty minutes) used by the power adjustment timer 533. The femto access point 419 may also incrementally increase 1016 the power adjustment factor 532.

For example, if a wireless communication device 420 that is part of the closed subscriber group (CSG) associated with the femto access point 419 is performing frequent handoffs and power was increased earlier by power adjustment factor=X dB prior to the power adjustment timer 533 expiration, then the power adjustment factor is made (X+1) dB and in effect the total transmit power is increased further by 1 dB. If a wireless communication device 420 that is not part of the closed subscriber group (CSG) associated with the femto access point 419 is performing frequent handoffs and power was decreased earlier by power adjustment factor=X dB prior to the power adjustment timer 533 expiration, then the power adjustment factor is made (X+1) dB and so the total transmit power is reduced further by 1 dB Thus, the transmit power adjustment factor 532 and the duration for which transmit power 535 is adjusted may be adapted based on the severity of frequent handoff events. The femto access point 419 may then again adjust 1004 the transmit power 535 of the femto access point 419 by the power adjustment factor 532.

If frequent idle handoffs by the wireless communication device 420 were not detected while the power adjustment timer 533 was running, the femto access point 419 may incrementally decrease 1018 the power adjustment time 534 used by the power adjustment timer 533. The femto access point 419 may also incrementally decrease 1020 the power adjustment factor 532.

For example, a wireless communication 420 that is part of the closed subscriber group (CSG) associated with the femto access point 419 was performing frequent idle handoffs and power was increased earlier by power adjustment factor=X dB prior to the power adjustment timer 533 expiration. If this wireless communication device 420 does not perform frequent idle handoffs when the power adjustment timer 533 is running then the power adjustment factor is made (X−1) dB and so the new total transmit power is reduced by 1 dB.

The femto access point 419 may readjust 1022 the transmit power to the previous transmit power level. The femto access point 419 may then wait to detect 1002 frequent idle handoffs by a wireless communication device 420.

Figure 11:
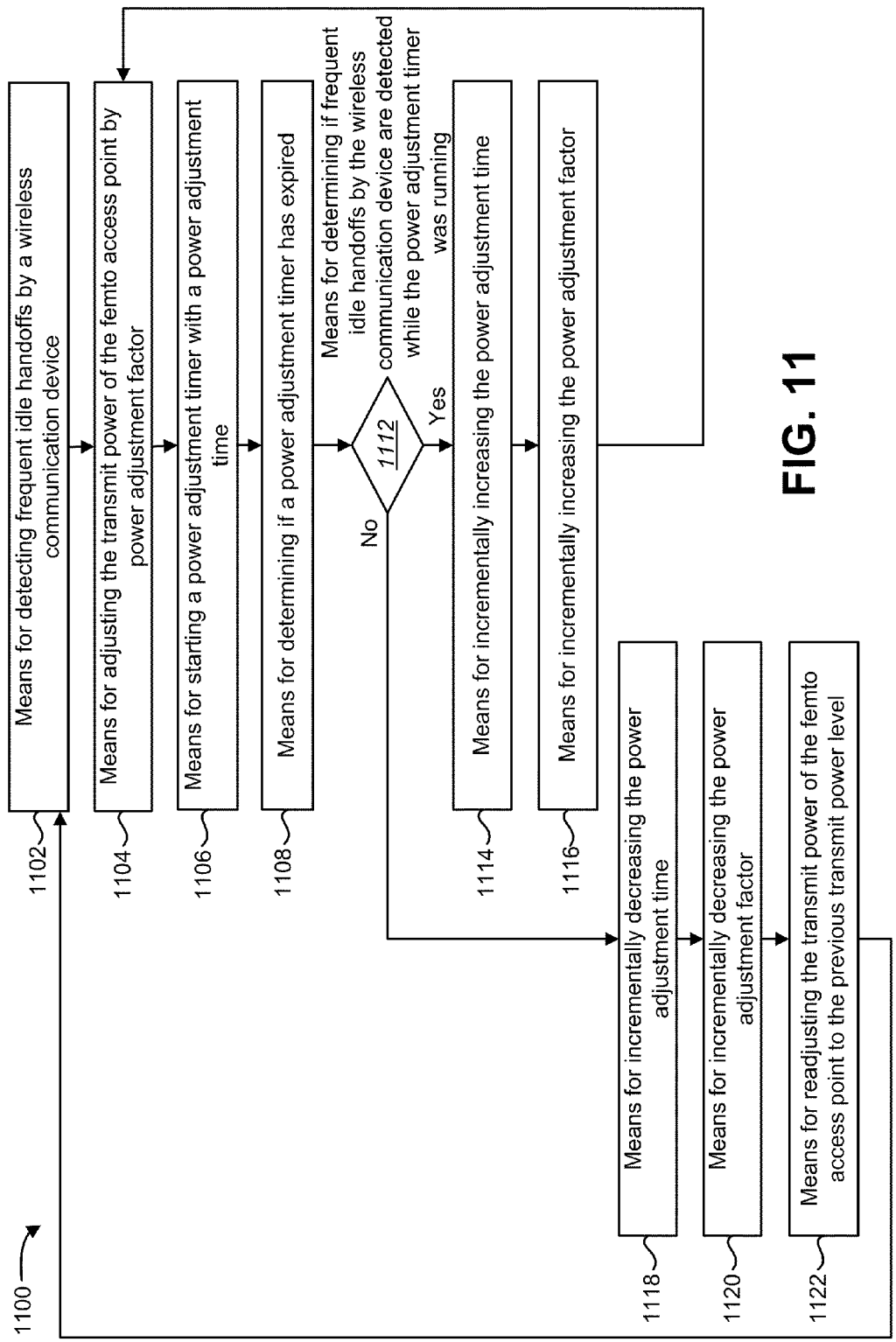
FIG. 11 illustrates means-plus-function blocks corresponding to the method of FIG. 10.

The method 1000 of FIG. 10 described above may be performed by various hardware and/or software component(s) and/or module(s) corresponding to the means-plus-function system 1100 illustrated in FIG. 11. In other words, blocks 1002 through 1022 illustrated in FIG. 10 correspond to means-plus-function blocks 1102 through 1122 illustrated in FIG. 11. For example, system 1100 can reside at least partially within a base station, or mobile device, etc. It is to be appreciated that system 1100 is represented as including functional blocks, which can represent functions implemented by a processor, software, or combination thereof, such as, for example, firmware. Additionally, the system 1100 may include a memory (not shown) that retains instructions for executing functions associated with blocks 1102 through 1122.

In one configuration, the femto access point 419 can adjust the transmit power 535 according to the time of the day. For example, a femto access point 419 can learn that preferred users (i.e., wireless communication devices 420 that are part of the closed subscriber group (CSG) associated with the femto access point 419) are out of the home during regular business hours, allowing the femto access point 419 to reduce the transmit power 535 to limit handoffs/registrations by non-preferred users during regular business hours.

Figure 12:
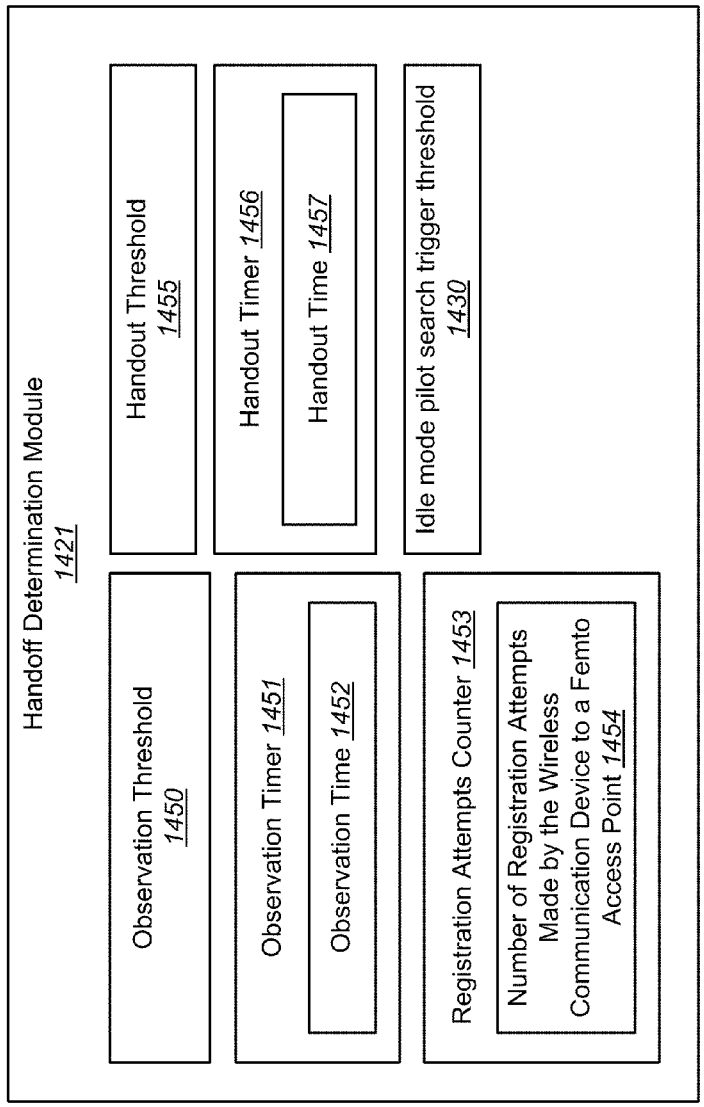
FIG. 12 is a block diagram illustrating a handoff determination module.

FIG. 12 is a block diagram illustrating a handoff determination module 1421. The handoff determination module 1421 of FIG. 12 may be one configuration of the handoff determination modules 421a-b of FIG. 4. The handoff determination module 1421 may be located on a wireless communication device 420 (i.e., the first wireless communication device 420 or the second wireless communication device 420).

The handoff determination module 1421 may include an observation threshold 1450. The observation threshold 1450 may be a predefined threshold that is used by the handoff determination module 1421 to determine when to delay idle handoffs. The handoff determination module 1421 may also include an observation timer 1451 with an observation time 1452.

The handoff determination module 1421 may include a registration attempts counter 1453 that counts the number 1454 of registration attempts/requests by the wireless communication device 420 to a femto access point 419. If the number 1454 of registrations attempted by a wireless communication device 420 during the observation time 1452 is greater than the observation threshold 1450, the handoff determination module 1421 may delay idle handoffs away from the femto access point 419 (i.e., idle handout) for a handout time 1457 using a handout timer 1456. In one configuration, the handout time 1457 may be between two and five minutes. This mechanism is discussed in further detail below in relation to FIG. 13.

The handoff determination module 1421 may include a handout threshold 1455. The handout threshold 1455 may be a predefined threshold that is used by the handoff determination module 1421 to determine when to handoff from the femto access point 419. For example, the handout threshold 1455 may be set to −15 dB or another appropriate value at which the wireless communication device 420 can still receive service from the femto access point 419 with reasonably good quality. Unless the power level of signals received from the femto access point 419 falls below the handout threshold 1455 during the handout time 1457, the handoff determination module 1421 may prevent the wireless communication device 420 from performing an idle handoff away from the femto access point 419.

The handoff determination module 1421 may include an idle mode pilot search trigger threshold 1430. Idle mode pilot search trigger thresholds 1430 were discussed above in relation to FIG. 6. An idle mode pilot search trigger threshold 1430 may determine the amount of time a wireless communication device 420 waits before searching for pilot signals from other base stations. In one configuration, the idle mode pilot search trigger threshold 1430 may reflect a minimum increase in received pilot power from a non-serving base station over the received pilot power from a current serving base station before an idle handoff is triggered to leave the current serving base station and handoff to the non-serving base station.

The wireless communication device 420 may receive instructions from a femto access point 419 to adjust the idle mode pilot search trigger threshold 1430. In one configuration, the instructions to adjust the idle mode pilot search trigger threshold 1430 may include the specific adjustments to be made to the idle mode pilot search trigger threshold 1430. The wireless communication device 420 may determine whether changes are needed to the idle mode pilot search trigger threshold 1430. In one configuration, determining whether changes are needed to the idle mode pilot search trigger threshold 1430 may include determining whether instructions to adjust the idle mode pilot search trigger threshold 1430 were received from a femto access point 419.

Figure 13:
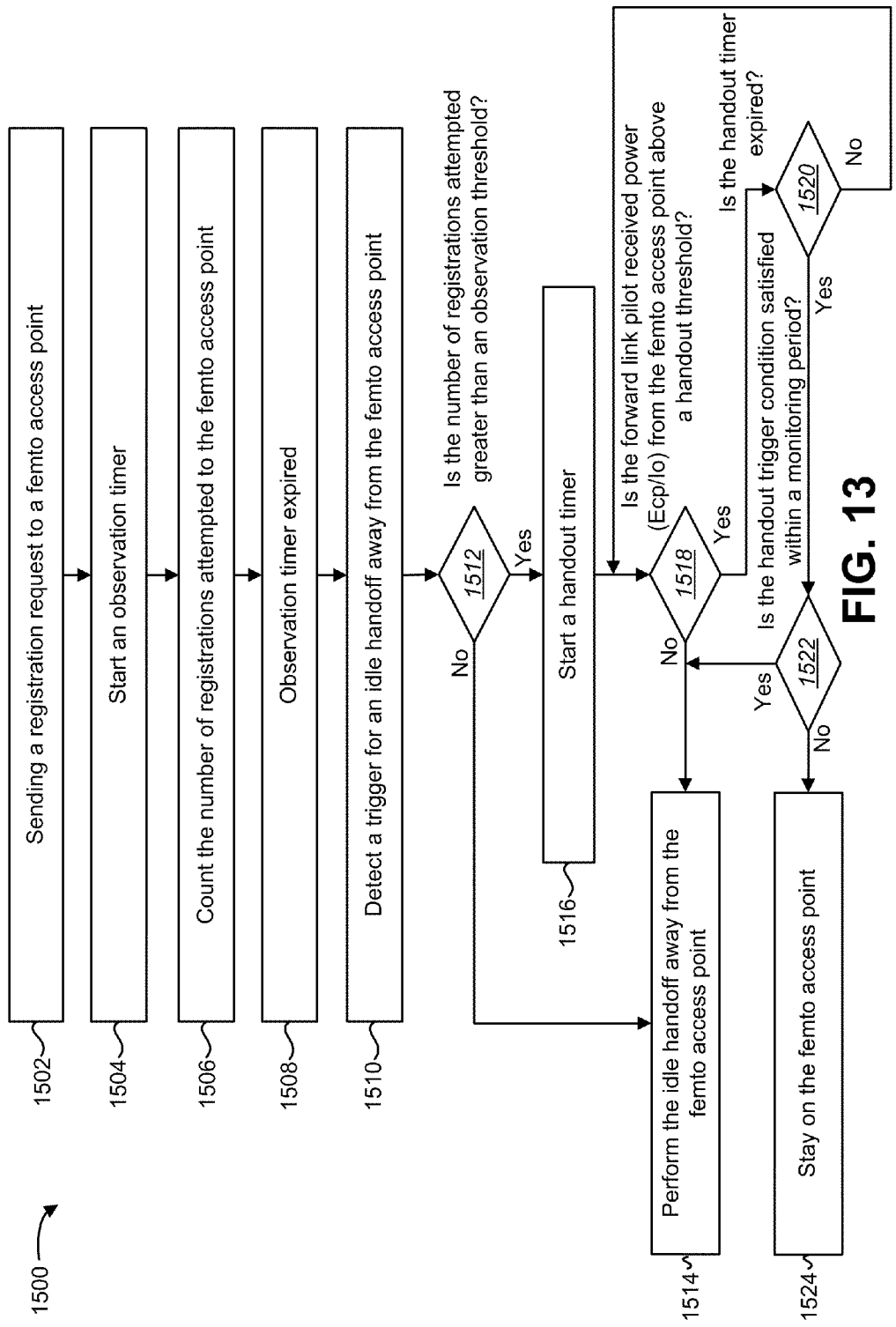
FIG. 13 is a flow diagram of a method for reducing handoffs by a wireless communication device.

FIG. 13 is a flow diagram of a method 1500 for reducing handoffs by a wireless communication device 420. The method 1500 may be performed by the wireless communication device 420. The wireless communication device 420 may or may not be part of a closed subscriber group (CSG) associated with a femto access point 419. The wireless communication device 420 may be able to distinguish between femto access point 419 pilot and macro base station 418 pilot signatures (PNs).

The wireless communication device 420 may send 1502 a registration request to the femto access point 419. In one configuration, sending 1502 a registration request to the femto access point 419 may be part of performing registration to the femto access point 419. If the wireless communication device 420 is not part of the closed subscriber group (CSG) associated with the femto access point 419, the registration to the femto access point 419 may fail. Alternatively, the wireless communication device 420 may be granted limited access to the femto access point 419.

The wireless communication device 420 may start 1504 an observation timer 1451. The wireless communication device 420 may then count 1506 the number 1454 of registrations attempts to the femto access point 419. The number 1454 of registration attempts to the femto access point 419 may include both successful registrations and failed registration attempts. The observation timer 1451 may expire 1508 after the observation time 1452 has elapsed. The wireless communication device 420 may then detect 1510 a trigger for an idle handoff away from the femto access point 419. The wireless communication device 420 may determine 1512 whether the number 1454 of registrations attempted to the femto access point 419 is greater than an observation threshold 1450.

If the number 1454 of registrations performed to the femto access point 419 is greater than the observation threshold 1450, the wireless communication device 420 has detected a frequent handoff condition. The wireless communication device 420 may start 1516 a handout timer 1456. The wireless communication device 420 may then determine 1518 whether the forward link pilot received power (Ecp/Io) from the femto access point 419 is above a handout threshold 1455.

If the forward link pilot received power (Ecp/Io) from the femto access point 419 is above the handout threshold 1455, the wireless communication device 420 may determine 1520 whether the handout timer 1456 has expired. If the handout timer 1456 has not expired, the wireless communication device 420 may return to determining 1518 if the forward link pilot received power (Ecp/Io) from the femto access point 419 is above the handout threshold 1455.

If the handout timer 1456 has expired, the wireless communication device 420 may determine 1522 whether the handout trigger condition was satisfied within a monitoring period. In other words, the wireless communication device 420 may determine whether the conditions that triggered the idle handoff away from the femto access point 419 still indicate that an idle handoff away from the femto access point 419 is necessary. If the handout trigger condition was satisfied within a monitoring period, the wireless communication device 420 may perform 1514 the idle handoff away from the femto access point 419. If the handout trigger condition was not satisfied within a monitoring period, the wireless communication device 420 may stay 1524 on the femto access point 419.

If the forward link pilot received power (Ecp/Io) from the femto access point 419 falls below the handout threshold 1455, the wireless communication device 420 may perform 1514 the idle handoff away from the femto access point 419 without further delay. If the number 1454 of registrations attempted by the wireless communication device 420 to the femto access point 419 is not greater than the observation threshold 1450, the wireless communication device 420 may perform 1514 the idle handoff away from the femto access point 419 without any delay.

Figure 14:
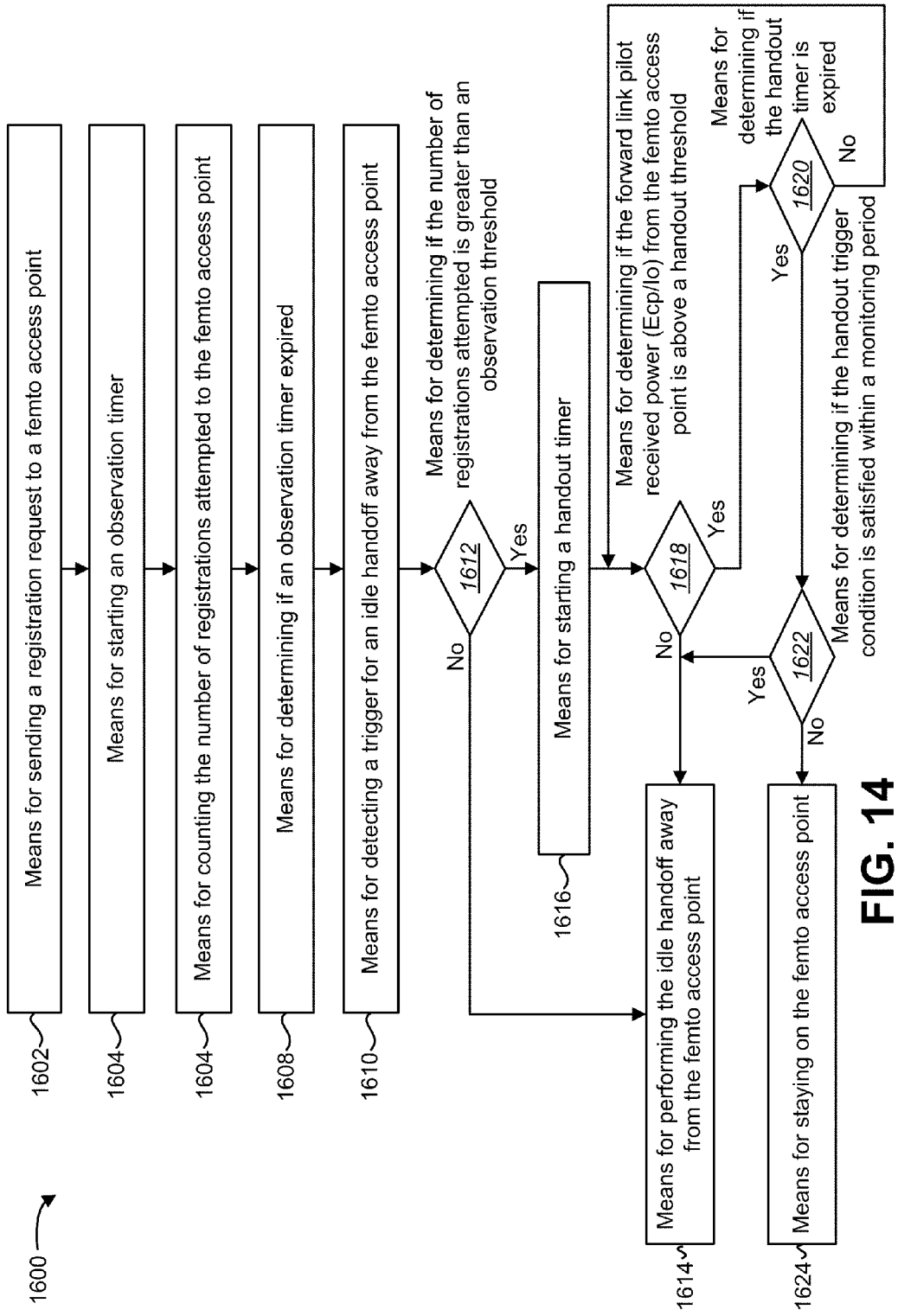
FIG. 14 illustrates means-plus-function blocks corresponding to the method of FIG. 13.

The method 1500 of FIG. 13 described above may be performed by various hardware and/or software component(s) and/or module(s) corresponding to the means-plus-function system 1600 illustrated in FIG. 14. In other words, blocks 1502 through 1524 illustrated in FIG. 13 correspond to means-plus-function blocks 1602 through 1624 illustrated in FIG. 14. For example, system 1600 can reside at least partially within a base station, or mobile device, etc. It is to be appreciated that system 1600 is represented as including functional blocks, which can represent functions implemented by a processor, software, or combination thereof, such as, for example, firmware. Additionally, the system 1600 may include a memory (not shown) that retains instructions for executing functions associated with blocks 1602 through 1624.

Figure 17:
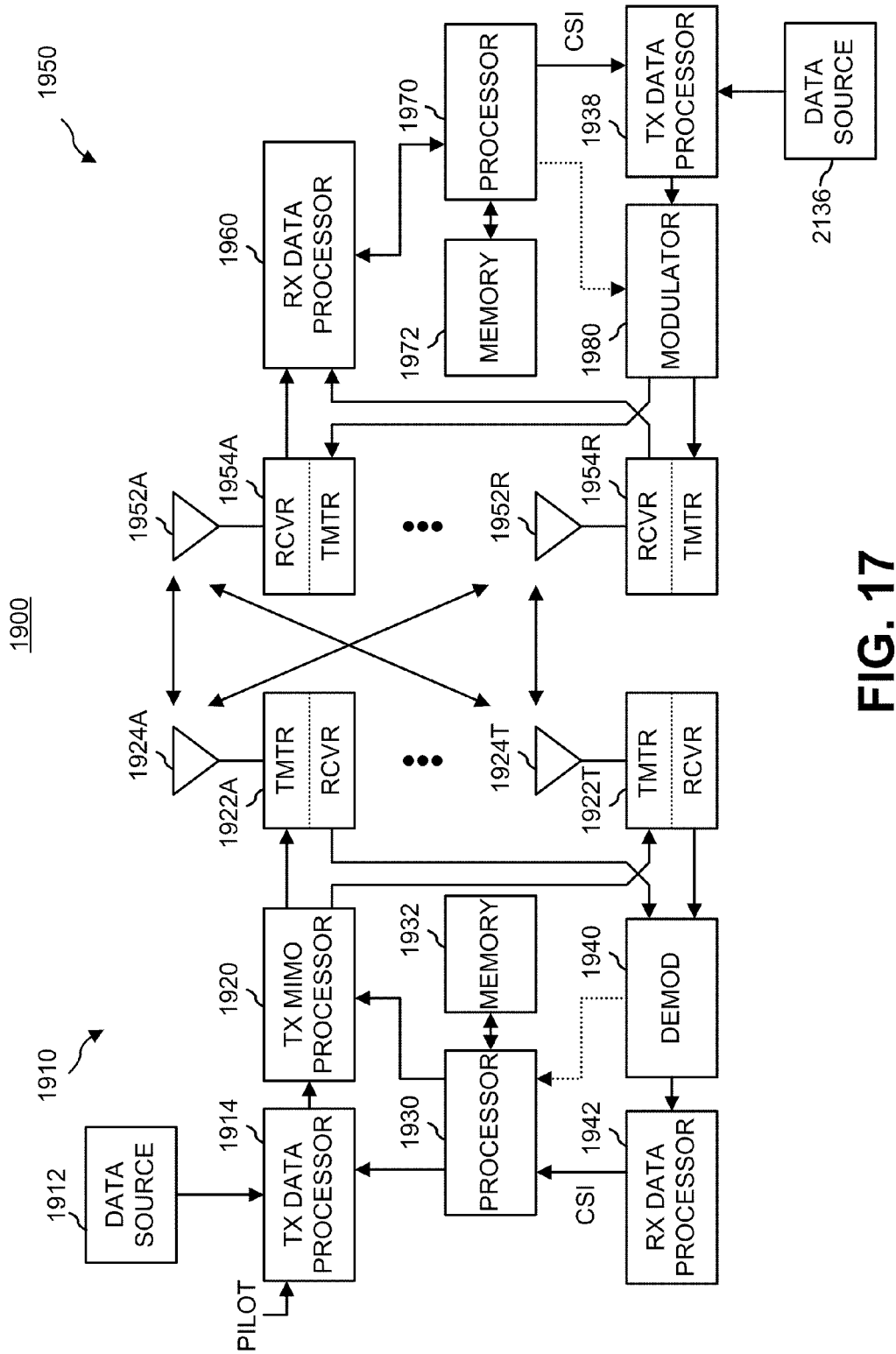
FIG. 17 illustrates two wireless devices in a multiple-in and multiple-out (MIMO) system.

FIG. 17 is a flow diagram of another method 1700 for reducing frequent handoffs by a wireless communication device 420. The method 1700 may be performed by the wireless communication device 420. The wireless communication device 420 may or may not be part of a closed subscriber group (CSG) associated with a femto access point 419.

The wireless communication device 420 may send 1702 a registration request to the femto access point 419. In one configuration, sending 1702 a registration request to the femto access point 419 may be part of performing registration to the femto access point 419. The wireless communication device 420 may detect 1704 a trigger for an idle handoff away from the femto access point 419. The wireless communication device 420 may then start 1706 a handout timer 1456. The wireless communication device 420 may determine 1708 whether the forward link pilot received power (Ecp/Io) from the femto access point 419 is below a handout threshold 1455. As an example, the handout threshold 1455 may be a received power of −15 dB (below which overhead channels may not be decoded successfully).

If the forward link pilot received power (Ecp/Io) from the femto access point 419 is below the handout threshold 1455, the wireless communication device 420 may perform 1710 an idle handoff away from the femto access point 419. If the forward link pilot received power (Ecp/Io) from the femto access point 419 is not below the handout threshold 1455, the wireless communication device 420 may determine 1712 whether the handout timer 1456 has expired. If the handout timer 1456 has not expired, the wireless communication device may return to detecting 1704 a trigger for an idle handoff away from the femto access point 419.

If the handout timer 1456 has expired, the wireless communication device 420 may determine 1714 whether the handout trigger condition was satisfied within a monitoring period. In other words, the wireless communication device 420 may determine whether conditions are such that an idle handoff away from the femto access point 419 is still necessary (i.e., triggered). If the handout condition is satisfied within a monitoring period, the wireless communication device 420 may stay 1716 on the femto access point 419. If the handout condition is not satisfied within a monitoring period, the wireless communication device 420 may perform 1710 an idle handoff away from the femto access point 419. Thus, the method 1700 simply delays idle handoffs based on the handout timer 1456, irrespective of whether frequent handoffs are occurring.

Figure 15:
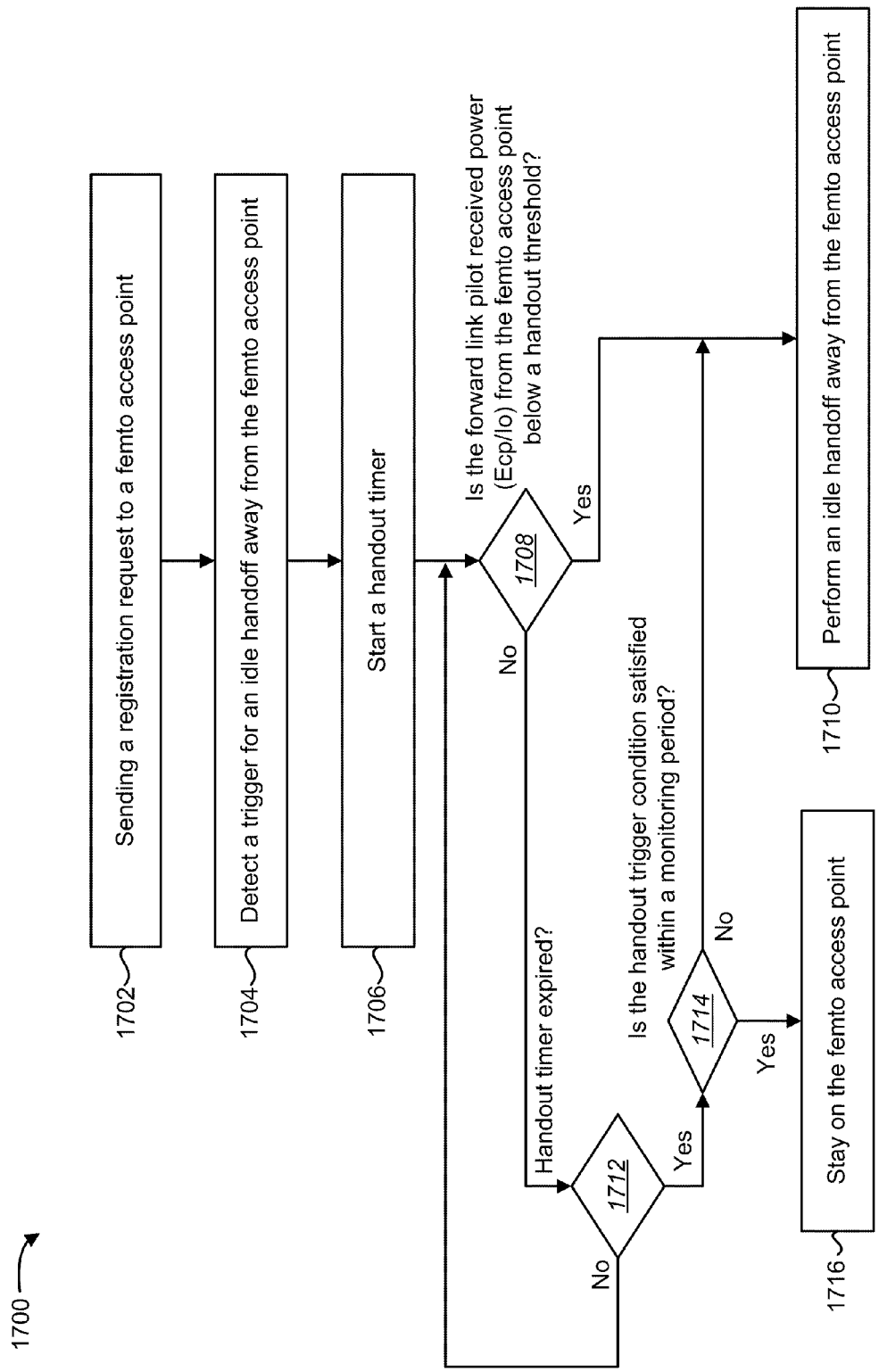
FIG. 15 is a flow diagram of another method for reducing frequent handoffs by a wireless communication device.
Figure 16:
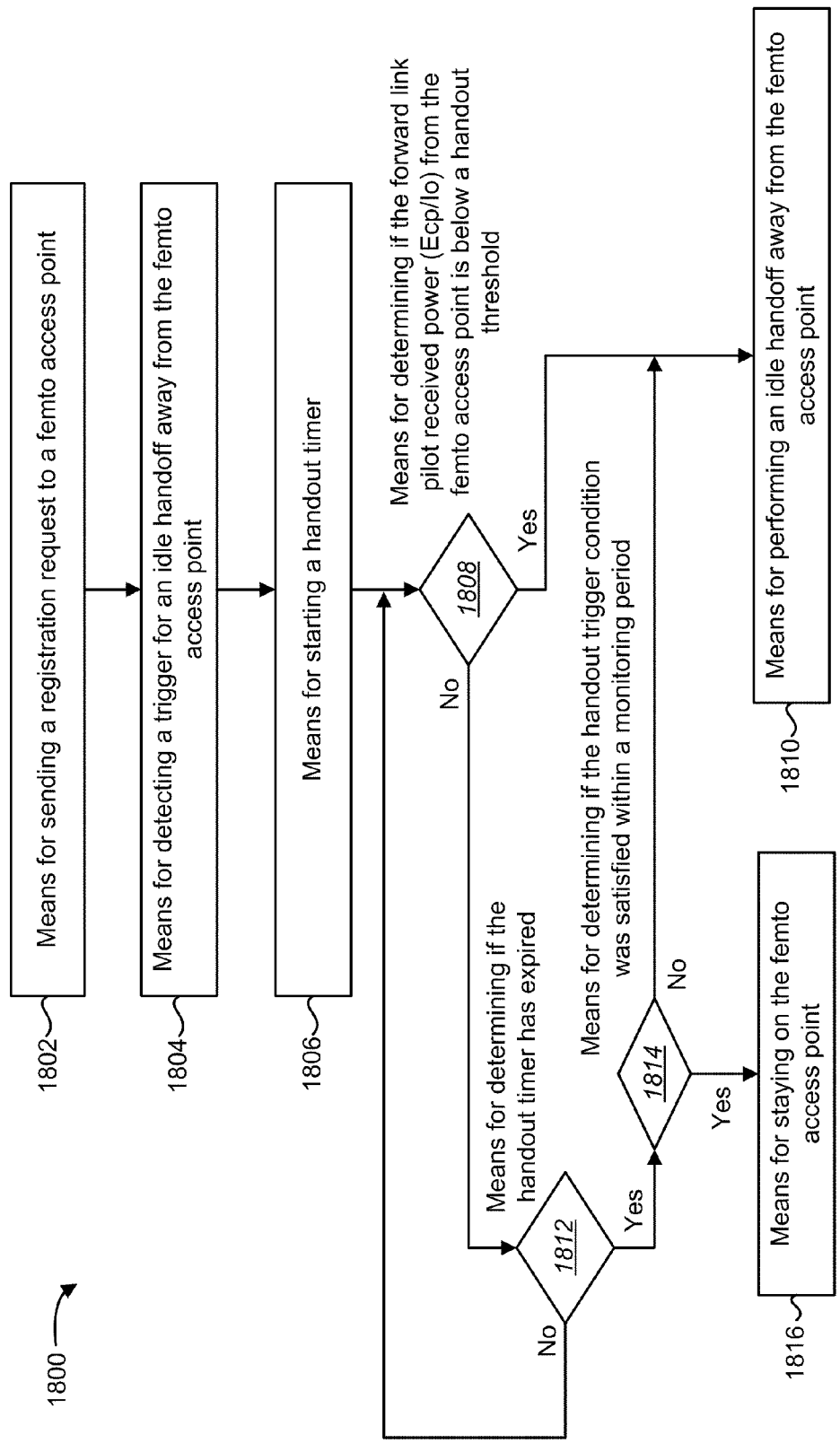
FIG. 16 illustrates means-plus-function blocks corresponding to the method of FIG. 15.

The method 1700 of FIG. 15 described above may be performed by various hardware and/or software component(s) and/or module(s) corresponding to the means-plus-function system 1800 illustrated in FIG. 16. In other words, blocks 1702 through 1716 illustrated in FIG. 15 correspond to means-plus-function blocks 1802 through 1816 illustrated in FIG. 16. For example, system 1800 can reside at least partially within a base station, or mobile device, etc. It is to be appreciated that system 1800 is represented as including functional blocks, which can represent functions implemented by a processor, software, or combination thereof, such as, for example, firmware. Additionally, the system 1800 may include a memory (not shown) that retains instructions for executing functions associated with blocks 1802 through 1816.

FIG. 17 illustrates two wireless devices in a multiple-in and multiple-out (MIMO) system 1900. A MIMO system 1900 employs multiple ($N_T$) transmit antennas 1924 and multiple ($N_R$) receive antennas 1952 for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system 1900 may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a transmitting wireless device 1910 to extract transmit beamforming gain on the forward link when multiple antennas are available at the receiving wireless device 1950.

The teachings herein may be incorporated into a node (e.g., a device) employing various components for communicating with at least one other node. At the transmitting device 1910, traffic data for a number of data streams is provided from a data source 1912 to a transmit ("TX") data processor 1914.

In some aspects, each data stream is transmitted over a respective transmit antenna. The TX data processor 1914 formats, codes and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by a processor 1930. A data memory 1932 may store program code, data and other information used by the processor 1930 or other components of the device 1910.

The modulation symbols for all data streams are then provided to a TX MIMO processor 1920, which may further process the modulation symbols (e.g., for OFDM). The TX MIMO processor 1920 then provides $N_T$ modulation symbol streams to $N_T$ transceivers ("XCVR") 1922A through 1922T. In some aspects, the TX MIMO processor 1920 applies beamforming weights to the symbols of the data streams and to the antenna from which the symbol is being transmitted.

Each transceiver 1922 receives and processes a respective symbol stream to provide one or more analog signals, and further conditions (e.g., amplifies, filters and upconverts) the analog signals to provide a modulated signal suitable for transmission over the MIMO channel. $N_T$ modulated signals from transceivers 1922A through 1922T are then transmitted from $N_T$ antennas 1924A through 1924T, respectively.

At the receiving wireless device 1950, the transmitted modulated signals are received by $N_R$ antennas 1952A through 1952R and the received signal from each antenna 1952 is provided to a respective transceiver ("XCVR") 1954A through 1954R. Each transceiver 1954 conditions (e.g., filters, amplifies and downconverts) a respective received signal, digitizes the conditioned signal to provide samples and further processes the samples to provide a corresponding "received" symbol stream.

A receive ("RX") data processor 1960 then receives and processes the $N_R$ received symbol streams from $N_R$ transceivers 1954 based on a particular receiver processing technique to provide $N_T$ "detected" symbol streams. The RX data processor 1960 then demodulates, deinterleaves and decodes each detected symbol stream to recover the traffic data for the data stream. The processing by the RX data processor 1960 is complementary to that performed by the TX MIMO processor 1920 and the TX data processor 1914 at the transmitting wireless device 1910.

A processor 1970 periodically determines which pre-coding matrix to use (discussed below). The processor 1970 formulates a reverse link message comprising a matrix index portion and a rank value portion. A data memory 1972 may store program code, data and other information used by the processor 1970 or other components of the device 1950.

The reverse link message may comprise various types of information regarding the communication link and/or the received data stream. The reverse link message is then processed by a TX data processor 1938, which also receives traffic data for a number of data streams from a data source 1936, modulated by a modulator 1980, conditioned by the transceivers 1954A through 1954R and transmitted back to the device 1910.

At the device 1910, the modulated signals from the device 1950 are received by the antennas 1924, conditioned by the transceivers 1922, demodulated by a demodulator ("DEMOD") 1940 and processed by a RX data processor 1942 to extract the reverse link message transmitted by the device 1950. The processor 1930 then determines which pre-coding matrix to use for determining the beam-forming weights then processes the extracted message.

Figure 18:
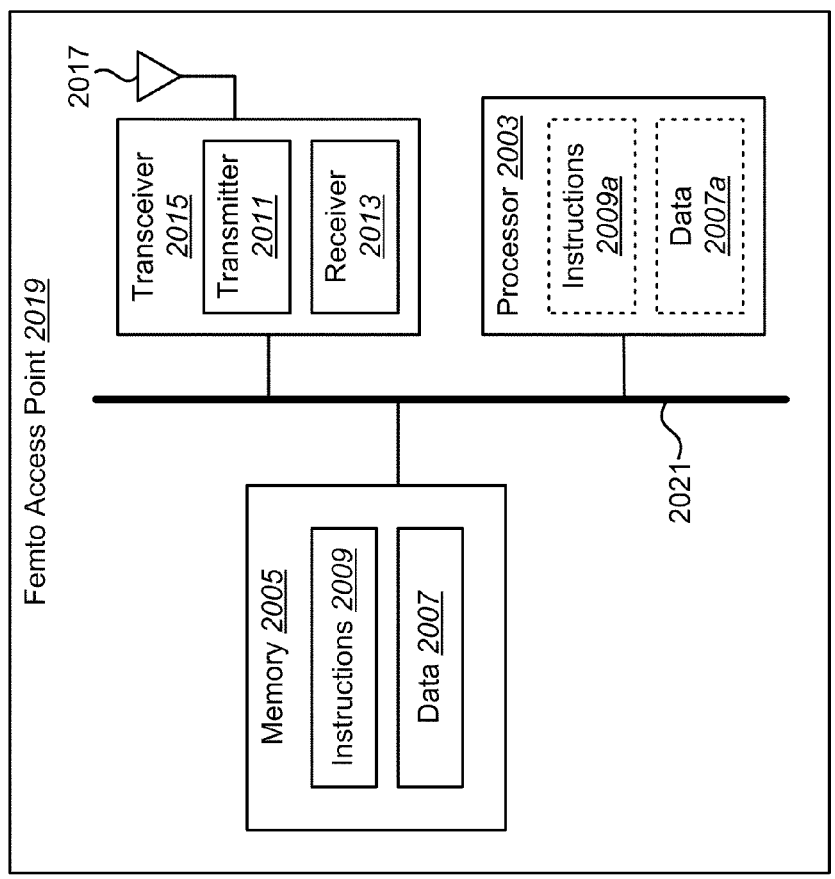
FIG. 18 illustrates certain components that may be included within a femto access point.

FIG. 18 illustrates certain components that may be included within a femto access point 2019. A femto access point 2019 may also be referred to as, and may include some or all of the functionality of, a femtocell, a picocell, a home NodeB (HNB), a home evolved NodeB (HeNB), etc. The femto access point 2019 includes a processor 2003. The processor 2003 may be a general purpose single- or multi-chip microprocessor (e.g., an ARM), a special purpose microprocessor (e.g., a digital signal processor (DSP)), a microcontroller, a programmable gate array, etc. The processor 2003 may be referred to as a central processing unit (CPU). Although just a single processor 2003 is shown in the femto access point 2019 of FIG. 18, in an alternative configuration, a combination of processors (e.g., an ARM and DSP) could be used.

The femto access point 2019 also includes memory 2005. The memory 2005 may be any electronic component capable of storing electronic information. The memory 2005 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 2007 and instructions 2009 may be stored in the memory 2005. The instructions 2009 may be executable by the processor 2003 to implement the methods disclosed herein. Executing the instructions 2009 may involve the use of the data 2007 that is stored in the memory 2005. When the processor 2003 executes the instructions 2009, various portions of the instructions 2009a may be loaded onto the processor 2003, and various pieces of data 2007a may be loaded onto the processor 2003.

The femto access point 2019 may also include a transmitter 2011 and a receiver 2013 to allow transmission and reception of signals to and from the femto access point 2019. The transmitter 2011 and receiver 2013 may be collectively referred to as a transceiver 2015. An antenna 2017 may be electrically coupled to the transceiver 2015. The femto access point 2019 may also include (not shown) multiple transmitters, multiple receivers, multiple transceivers and/or additional antennas.

The various components of the femto access point 2019 may be coupled together by one or more buses, which may include a power bus, a control signal bus, a status signal bus, a data bus, etc. For the sake of clarity, the various buses are illustrated in FIG. 18 as a bus system 2021.

Figure 19:
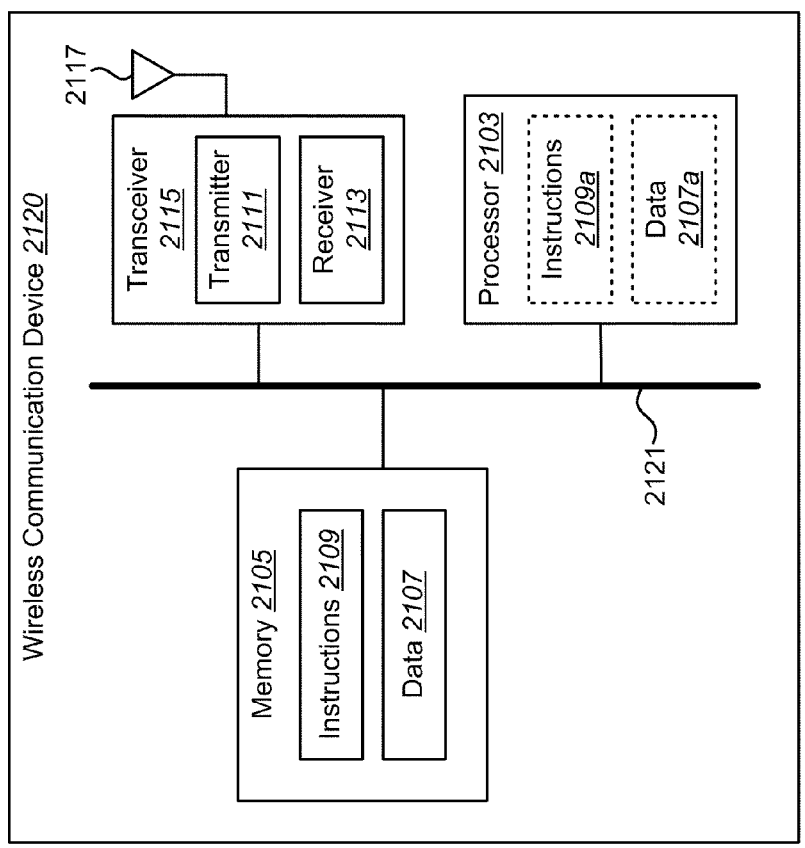
FIG. 19 illustrates certain components that may be included within a wireless communication device.

FIG. 19 illustrates certain components that may be included within a wireless communication device 2120. The wireless communication device 2120 may be an access terminal, a mobile station, a user equipment (UE), etc. The wireless communication device 2120 includes a processor 2103. The processor 2103 may be a general purpose single- or multi-chip microprocessor (e.g., an ARM), a special purpose microprocessor (e.g., a digital signal processor (DSP)), a microcontroller, a programmable gate array, etc. The processor 2103 may be referred to as a central processing unit (CPU). Although just a single processor 2103 is shown in the wireless communication device 2120 of FIG. 19, in an alternative configuration, a combination of processors (e.g., an ARM and DSP) could be used.

The wireless communication device 2120 also includes memory 2105. The memory 2105 may be any electronic component capable of storing electronic information. The memory 2105 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 2107 and instructions 2109 may be stored in the memory 2105. The instructions 2109 may be executable by the processor 2103 to implement the methods disclosed herein. Executing the instructions 2109 may involve the use of the data 2107 that is stored in the memory 2105. When the processor 2103 executes the instructions 2109, various portions of the instructions 2109a may be loaded onto the processor 2103, and various pieces of data 2107a may be loaded onto the processor 2103.

The wireless communication device 2120 may also include a transmitter 2111 and a receiver 2113 to allow transmission and reception of signals to and from the wireless communication device 2106. The transmitter 2111 and receiver 2113 may be collectively referred to as a transceiver 2115. An antenna 2117 may be electrically coupled to the transceiver 2115. The wireless communication device 2120 may also include (not shown) multiple transmitters, multiple receivers, multiple transceivers and/or additional antennas.

The various components of the wireless communication device 2120 may be coupled together by one or more buses, which may include a power bus, a control signal bus, a status signal bus, a data bus, etc. For the sake of clarity, the various buses are illustrated in FIG. 19 as a bus system 2121.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 6, 8, 10, 13 and 15, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for reducing frequent idle handoffs of a wireless communication device, comprising:
   receiving a registration request from the wireless communication device; starting a registration timer;
   counting a number of registration requests comprising successful and unsuccessful registration requests received from the wireless communication device while the registration timer is running;
   determining whether the number of registration requests received is greater than a registration threshold;
   determining that the number of registration requests received is greater than the registration threshold, and in response, further determining whether the wireless communication device is part of a closed subscriber group (CSG);
   and adjusting a transmit power of a femto access point, based on whether the wireless communication device is part of the CSG, in response to the number of registration requests received being greater than the registration threshold, wherein adjusting the transmit power comprises increasing the transmit power in response to the wireless communication device being part of the CSG a closed subscriber group (CSG) or decreasing the transmit power in response to the wireless communication device being not part of the CSG.

2. The method of claim 1, wherein the transmit power of the femto access point is adjusted by a power adjustment factor.

3. The method of claim 2, further comprising:
   starting a power adjustment timer with a power adjustment time;
   determining that the power adjustment timer has expired; and
   determining whether frequent idle handoffs by the wireless communication device were detected while the power adjustment timer was running.

4. The method of claim 3, wherein frequent handoffs by the wireless communication device were detected while the power adjustment timer was running, and further comprising incrementally increasing the power adjustment time.

5. The method of claim 3, wherein frequent handoffs by the wireless communication device were detected while the power adjustment timer was running, and further comprising incrementally increasing the power adjustment factor.

6. The method of claim 3, wherein frequent handoffs by the wireless communication device were not detected while the power adjustment timer was running, and further comprising incrementally decreasing the power adjustment time.

7. The method of claim 3, wherein frequent handoffs by the wireless communication device were not detected while the power adjustment timer was running, and further comprising incrementally decreasing the power adjustment factor.

8. The method of claim 3, further comprising readjusting the transmit power to a previous transmit power.

9. The method of claim 1, wherein adjusting the transmit power of the femto access point comprises adjusting a total forward link transmit power of the femto access point.

10. The method of claim 1, wherein adjusting the transmit power of the femto access point comprises adjusting a forward link pilot transmit power of the femto access point.

11. The method of claim 1, wherein a registration request is an active handoff request passed via a core network.

12. A wireless device configured for reducing frequent idle handoffs of a wireless communication device, comprising:
a processor;
memory in electronic communication with the processor;
instructions stored in the memory, the instructions being executable by the processor to:
receive a registration request from the wireless communication device;
start a registration timer;
count a number of registration requests comprising successful and unsuccessful registration requests received from the wireless communication device while the registration timer is running;
determine whether the number of registration requests received is greater than a registration threshold;
determine that the number of registration requests received is greater than the registration threshold, and in response, further determine whether the wireless communication device is part of a closed subscriber group (CSG);
and adjust a transmit power of a femto access point, based on whether the wireless communication device is part of the CSG, in response to the number of registration requests received being greater than the registration threshold, wherein adjusting the transmit power comprises increasing the transmit power in response to the wireless communication device being part of the CSG or decreasing the transmit power in response to the wireless communication device being not part of the CSG.

13. The wireless device of claim 12, wherein the wireless device is a femto access point.

14. The wireless device of claim 13, wherein the transmit power of the femto access point is adjusted by a power adjustment factor.

15. The wireless device of claim 14, wherein the instructions are further executable to:
start a power adjustment timer with a power adjustment time;
determine that the power adjustment timer has expired; and
determine whether frequent idle handoffs by the wireless communication device were detected while the power adjustment timer was running.

16. The wireless device of claim 15, wherein frequent handoffs by the wireless communication device were detected while the power adjustment timer was running, and wherein the instructions are further executable to incrementally increase the power adjustment time.

17. The wireless device of claim 15, wherein frequent handoffs by the wireless communication device were detected while the power adjustment timer was running, and wherein the instructions are further executable to incrementally increase the power adjustment factor.

18. The wireless device of claim 15, wherein frequent handoffs by the wireless communication device were not detected while the power adjustment timer was running, and wherein the instructions are further executable to incrementally decrease the power adjustment time.

19. The wireless device of claim 15, wherein frequent handoffs by the wireless communication device were not detected while the power adjustment timer was running, and wherein the instructions are further executable to incrementally decrease the power adjustment factor.

20. The wireless device of claim 15, wherein the instructions are further executable to readjust the transmit power of the femto access point to a previous transmit power.

21. The wireless device of claim 13, wherein adjusting the transmit power of the femto access point comprises adjusting a total forward link transmit power of the femto access point.

22. The wireless device of claim 13, wherein adjusting the transmit power of the femto access point comprises adjusting a forward link pilot transmit power of the femto access point.

23. The wireless device of claim 13, wherein a registration request is an active handoff request passed via a core network.

24. A wireless device configured for reducing frequent idle handoffs of a wireless communication device, comprising:
means for receiving a registration request from the wireless communication device;
means for starting a registration timer;
means for counting a number of registration requests comprising successful and unsuccessful registration requests received from the wireless communication device while the registration timer is running;
means for determining whether the number of registration requests received is greater than a registration threshold;
means for determining, in response to the number of registration requests received being determined to be greater than the registration threshold, whether the wireless communication device is part of a closed subscriber group (CSG);
and means for adjusting a transmit power of a femto access point, based on whether the wireless communication device is part of the CSG, in response to the number of registration requests received being greater than the registration threshold, wherein adjusting the transmit power comprises increasing the transmit power in response to the wireless communication device being part of the CSG or decreasing the transmit power in response to the wireless communication device being not part of the CSG.

25. A computer-program product for reducing frequent idle handoffs of a wireless communication device, the computer-program product comprising a computer-readable medium having instructions thereon, the instructions comprising:
code for causing at least one computer to receive a registration request from the wireless communication device;

code for causing at least one computer to start a registration timer;

code for causing at least one computer to count a number of registration requests comprising successful and unsuccessful registration requests received from the wireless communication device while the registration timer is running;

code for causing at least one computer to determine whether the number of registration requests received is greater than a registration threshold;

code for determining, in response to the number of registration requests received being determined to be greater than the registration threshold, whether the wireless communication device is part of a closed subscriber group (CSG);

and code for causing at least one computer to adjust a transmit power of a femto access point, based on whether the wireless communication device is part of the CSG, in response to the number of registration requests received being greater than the registration threshold, wherein adjusting the transmit power comprises increasing the transmit power in response to the wireless communication device being part of the CSG or decreasing the transmit power in response to the wireless communication device being not part of the CSG.

* * * * *